US010848768B2

(12) United States Patent
Krishnan

(10) Patent No.: US 10,848,768 B2
(45) Date of Patent: Nov. 24, 2020

(54) FAST REGION OF INTEREST CODING USING MULTI-SEGMENT RESAMPLING

(71) Applicant: Sony Interactive Entertainment Inc., Tokyo OT (JP)

(72) Inventor: Rathish Krishnan, Los Gatos, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/004,271

(22) Filed: Jun. 8, 2018

(65) Prior Publication Data

US 2019/0379893 A1 Dec. 12, 2019

(51) Int. Cl.

| | |
|---|---|
| ***H04N 19/00*** | (2014.01) |
| ***H04N 19/167*** | (2014.01) |
| ***H04N 19/196*** | (2014.01) |
| ***H04N 19/162*** | (2014.01) |
| ***H04N 19/172*** | (2014.01) |
| ***H04N 19/132*** | (2014.01) |

(52) U.S. Cl.

CPC ......... *H04N 19/167* (2014.11); *H04N 19/132* (2014.11); *H04N 19/162* (2014.11); *H04N 19/172* (2014.11); *H04N 19/198* (2014.11)

(58) Field of Classification Search

CPC .. H04N 19/167; H04N 19/132; H04N 19/162; H04N 19/172; H04N 19/198

See application file for complete search history.

(56) References Cited

U.S. PATENT DOCUMENTS

| | | | |
|---|---|---|---|
| 6,252,989 | B1 | 6/2001 | Geisler et al. |
| 6,623,428 | B2 | 9/2003 | Miller et al. |

(Continued)

FOREIGN PATENT DOCUMENTS

| | | | |
|---|---|---|---|
| GB | 2404105 | A | 1/2005 |
| WO | 2010137104 | A1 | 12/2010 |
| WO | 2017158236 | A3 | 11/2017 |

OTHER PUBLICATIONS

B. Patrão, S. Pedro, P. Menezes, How to Deal with Motion Sickness in Virtual Reality, Sciences and Technologies of Interaction (SciTecIN'15), EPCGI'2015: The 22nd Portuguese Conf. on Computer Graphics and Interaction, Coimbra, Portugal, 2015.

(Continued)

*Primary Examiner* — Zhihan Zhou

(74) *Attorney, Agent, or Firm* — JDI Patent; Joshua Isenberg; Robert Pullman

(57) ABSTRACT

In a method for video encoding, one or more parameters are determined for a region of interest (ROI) within a digital image. The parameters relate to a size, location, and shape of the ROI. Multi-segment downsampling is performed on the input image to generate a downsampled image having fewer pixels than the digital image. The downsampling uses a different sample density for the ROI than for a portion of the digital image outside the ROI. The downsampled image is encoded to generate encoded image data and the encoded image data is combined with the one or more parameters to generate combined data, which may then be transmitted or stored. A method for video decoding comprising decoding the encoded video and performing multi-segment upsampling on the decoded video is also disclosed.

19 Claims, 13 Drawing Sheets

(56) References Cited

U.S. PATENT DOCUMENTS

| | | | | |
|---|---|---|---|---|
| 9,936,208 | B1 * | 4/2018 | Brailovskiy | H04N 19/42 |
| 2003/0189579 | A1 | 10/2003 | Pope | |
| 2008/0310501 | A1 | 12/2008 | Ward et al. | |
| 2011/0141365 | A1 | 6/2011 | Park et al. | |
| 2011/0235706 | A1 | 9/2011 | Demircin et al. | |
| 2014/0044189 | A1 | 2/2014 | Pearlstein | |
| 2014/0267243 | A1 * | 9/2014 | Venkataraman | G06T 7/557<br>345/419 |
| 2014/0270553 | A1 * | 9/2014 | Zund | G06T 9/00<br>382/233 |
| 2015/0229945 | A1 | 8/2015 | Nakagami et al. | |
| 2015/0365687 | A1 * | 12/2015 | Le Floch | H04N 19/17<br>375/240.24 |
| 2016/0255354 | A1 * | 9/2016 | Yamamoto | H04N 19/70<br>375/240.12 |
| 2016/0358341 | A1 * | 12/2016 | Li | G06T 3/40 |
| 2018/0165886 | A1 * | 6/2018 | Lin | G06T 19/006 |
| 2018/0167613 | A1 * | 6/2018 | Hannuksela | H04N 21/23439 |
| 2018/0183998 | A1 * | 6/2018 | Menachem | H04N 5/23232 |
| 2019/0087979 | A1 * | 3/2019 | Mammou | H03M 7/30 |

OTHER PUBLICATIONS

Invitation to Pay Additional Fees dated Aug. 8, 2019 for International Patent Application No. PCT/US2019/036094.

Kienzle W., Schölkopf B., Wichmann F.A., Franz M.O. (2007) How to Find Interesting Locations in Video: A Spatiotemporal Interest Point Detector Learned from Human Eye Movements. In: Hamprecht F.A., Schnörr C., Jähne B. (eds) Pattern Recognition. DAGM 2007. Lecture Notes in Computer Science, vol. 4713. Springer, Berlin, Heidelberg.

U.S. Appl. 15/840,893, filed Dec. 13, 2018.

International Search Report and Written Opinion dated Oct. 17, 2019 for International Patent Application No. PCT/US2019/036094.

Sanchez et al. "Prioritized region of interest coding in JPEG2000." In: IEEE Transactions on 1-18 Circuits and Systems for Video Technology. Aug. 24, 2004 (Aug. 24, 2004) Retrieved on Sep. 22, 2019 (Sep. 22, 2019) from entire document.

* cited by examiner

FAST REGION OF INTEREST CODING USING MULTI-SEGMENT RESAMPLING

FIELD OF THE DISCLOSURE

Aspects of the present disclosure are related to digital image encoding and decoding. In particular the present disclosure relates to Region of Interest coding.

BACKGROUND

In video processing, Region of Interest (ROI) coding typically refers to the process of boosting the visual quality of a selected portion of a video frame relative to the rest of the video frame. ROI coding can be used for bandwidth reduction, and ensuring that visual fidelity in important parts of a scene are maintained during network congestion.

The traditional way of ROI coding involves manipulating the quantization parameter (QP) during the encoding process so that a lower QP is user for areas inside the ROI and a higher QP is used for the rest. This results in reducing the share of bits for the areas outside the ROI, which in turn lowers the picture quality of the background. While this approach helps in lowering the bitrate, it does not speed up the encoding process as it does not reduce the number of pixels that are processed.

Some existing methods to apply non-uniform resampling to an image utilize a transformation function to the entire image, which might result in a non-rectangular image that is not suited for popular image and video compression standards. For coding a non-rectangular pixel arrangement, a rectangular bounding box is used with padded pixels, and the padded rectangular image is then compressed using traditional means. This too is suboptimal as the encoder may need to process padded pixels that will not be displayed.

Other approaches might utilize two separate bitstreams, one for the ROI and the other for the background. The background may be downscaled to a lower resolution to reduce the encoding time. The final image is generated by blending the ROI over the background. The disadvantage of this method is that two encoder instances are needed to generate two bitstreams. At the display side, two decoder instances are needed and additional synchronization is needed which increases complexity.

It is within this context that aspects of the present disclosure arise.

DETAILED DESCRIPTION

Introduction

A new method of performing ROI coding is proposed which uses resampling to reduce the resolution of the input image without loss of detail in the ROI. The reduced resolution speeds up the encoding process that produces the compressed bitstream. Another resampling process is performed after decoding the compressed bitstream to reconstruct the image back to the original resolution. The proposed method achieves ROI coding while reducing the time needed to perform encoding.

The proposed solution has several advantages over some of the existing ROI coding techniques. The proposed solution reduces the resolution of the input image without loss of detail in the ROI, leading to faster encoding. ROI coding using the proposed solution can be performed using existing mainstream compression standards. Adjusting the QP to control the picture quality of the ROI and the background can be avoided. ROI coding using the proposed solution can be implemented using a single encoder instance. The resampled image can be rectangular which eliminates the need for padded pixels. The proposed solution allows for varying the ROI size and position between video frames. Resampling in both the encoding and decoding stages can be implemented efficiently on a graphics processor unit (GPU). The proposed solution also allows controlling the picture quality difference between the ROI and the background. Sharp boundaries between the ROI and background can be avoided with the proposed solution. Furthermore, the proposed solution may be extended to non-rectangular ROIs and also to multiple ROIs in the same image.

Methodology

As mentioned above, current techniques for ROI coding lower the bitrate, but do not reduce the number of pixels that are processed. Reducing the number of pixels in an image, also referred to as downsampling, usually results in a visible quality loss. The amount of quality loss depends on the degree of downsampling. This quality loss cannot be recovered by upsampling a downsampled image back to the original size. Aspects of the present disclosure utilize this characteristic of resampling is utilized to reduce the picture quality outside the ROI. Similarly, in order to preserve the detail in the ROI, the amount of resampling should be minimal. The proposed method utilizes resampling selectively in different segments of the image to replicate the characteristics of ROI coding. This method of selective resampling utilizing varying degrees of resampling in different segments of the image is referred to as multi-segment resampling.

Figure 1:
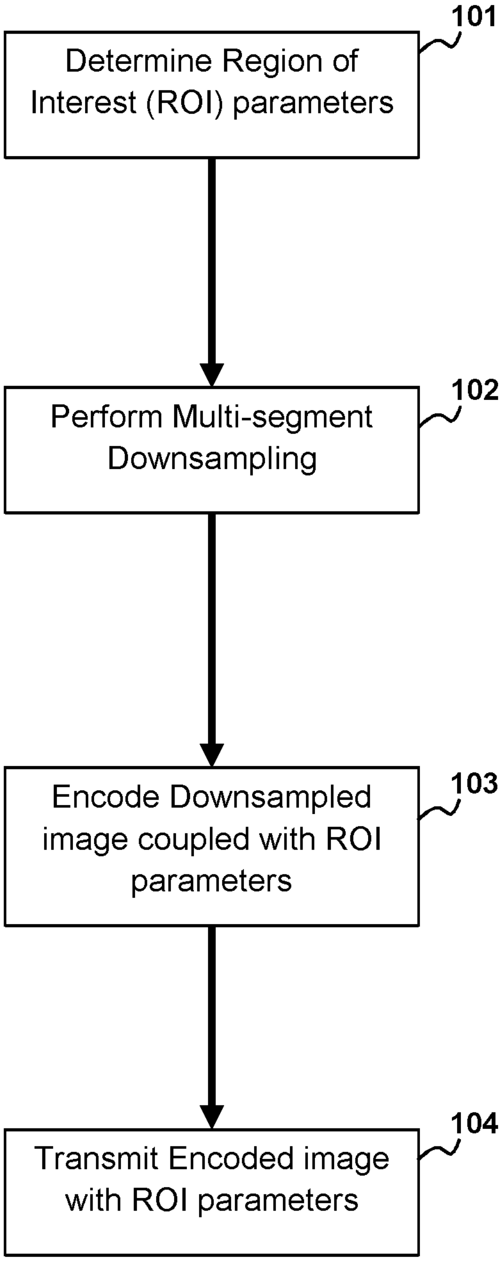
FIG. 1 depicts a flow diagram of the method for multi-segment down sampling for encoding according to aspects of the present disclosure.

According to aspects of the present disclosure the encoding procedure in the disclosed method is described in FIG. 1 and as follows. Determine the ROI parameters 101, related to the size, location, and shape of the ROI. By way of example and without limitation, in the case of a rectangular ROI these parameters may include offsets from each edge of a rectangular image to the ROI boundary. Perform multi-segment downsampling on the input image 102 to convert it to a smaller image. In other words convert the image in to one with fewer pixels than the original image. Encode the resulting downsampled image with the ROI parameters 103 included in a header or metadata. In alternative embodiments of the present invention unencoded ROI parameters may be included with the encoded downsampled images for example and without limitation ROI parameters may be transmitted separately or may be included in an unencoded wrapper of the encoded downsampled images. Transmit or store the resulting encoded data 104.

Figure 3A:
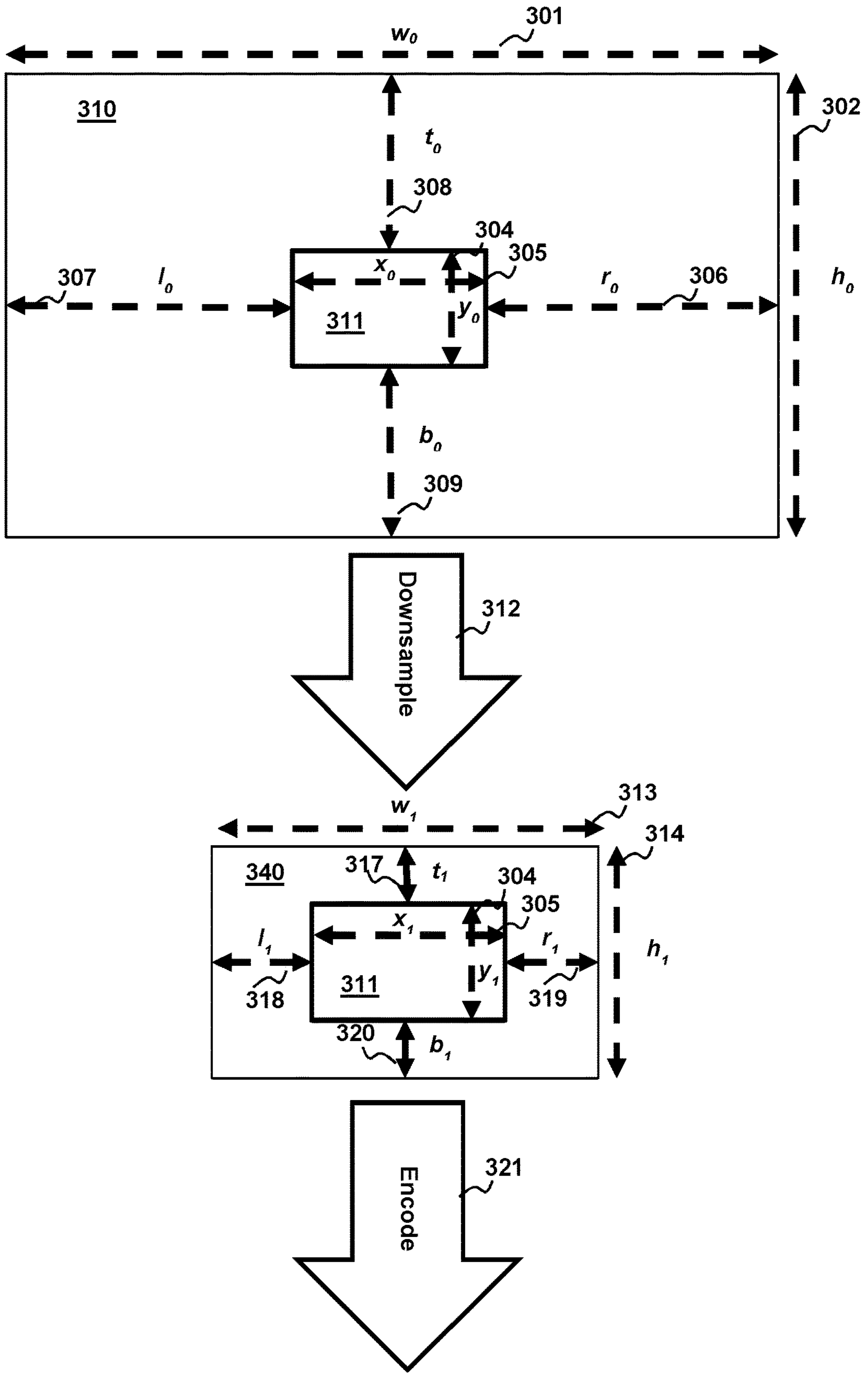
FIG. 3A depicts a schematic diagram for ROI parameter determination for multi-segment downsampling according to aspects of the present disclosure.

FIG. 3A illustrates an example of the encoding procedure in the particular case where both the original image 310 and the ROI 311 are rectangular. The parameters $l_0$, $t_0$, $r_0$, and $b_0$ represent the ROI 311 pixel offsets from the left 307, top 308, right 306, and bottom 309 boundaries of the original image 310, respectively. The width 301 and the height 302 of the original image are denoted as $w_0$ and $h_0$, while the width 305 and the height 304 of the ROI are denoted as $x_0$ and $y_0$.

$$x_0=w_0-l_0-r_0$$

$$y_0=h_0-t_0-b_0$$

The dimensions of the downsampled image 340 ($w_1$ and $h_1$) are chosen based on factors such as the required bitrate of the compressed image, and the degree of quality loss needed outside the ROI. The overall downsampling ratio is determined as follows:

$$R_w=\frac{w_0}{w_1}$$

$$R_h=\frac{h_0}{h_1}$$

Ideally, $w_1$ 313 and $h_1$ 314 should be fairly larger than $x_0$ and $y_0$ respectively, in order to avoid downsampling in the ROI 311. In some implementations $w_1$ and $h_1$ may be compared to threshold values for $x_0$ and $y_0$ to determine whether resampling is needed in the ROI. For such cases, resampling in the ROI could be avoided, and the downsampling ratios in the ROI are given by:

$$R_x=\frac{x_0}{x_1}=1$$

$$R_y=\frac{y_0}{y_1}=1$$

If downsampling in the ROI 311 is unavoidable, the downsampling ratios should be chosen as follows in order for the ROI to have better quality than the background:

$$R_x<R_w$$

$$R_y<R_h$$

At this stage, the values of $w_1$ 313, $h_1$ 314, $x_1$ 304 and $y_1$ 305 have been determined. The next step is the computation of the parameters $l_1$ 318 and $r_1$ 319. These values are computed using the following observations:

$$l_1+r_1=w_1-x_1$$

$$\frac{l_1}{r_1}=\frac{l_0}{r_0}$$

Using a similar approach, the values of $t_1$ 317 and $b_1$ 320 are also determined. Once all the parameters in the downsampled image are known, there are multiple options for determining the downsampling method 312, and the sampling points. The downsampling method 312 could be based on bilinear interpolation, spline interpolation, cubic interpolation etc.

The ROI 311 may significantly increase in size from one frame of the video stream to the next. This may be caused by sudden increase in detected eye movement or by a predicted increase in the size of the region of interest due to movement of elements in the picture. In some embodiments the ROI parameters may be compared to a threshold and if the parameters exceed the threshold, the system could terminate encoding the multi-segment down sampled video stream 321 at the current resolution of width $w_1$ 313 and height $h_1$ 314 and instead encode a new multi-segment down sampled video stream with frames or digital images at a higher resolution. In some embodiments the ROI parameters may be compared to a threshold and the system may terminate encoding multi-segment downsampled video stream with higher resolution frames or digital images and begin encoding a new stream with the original or lower values for of width $w_1$ 313 and height $h_1$ 314. The threshold may be determined empirically based on without limitation, the actual screen size, quality loss or some other metric. In alternative embodiments the system may modify ROI parameters so that the downsampling ratios increase. By way of example and not by way of limitation $x_1$ and $y_1$ may be reduced and as result the ratios $R_x$ and $R_y$ are increased. Likewise modifying $x_1$ and $y_1$ also modifies $l_1$, $r_1$, $t_1$ and $b_1$. In some alternative embodiments the system may increase the $x_1$ and $y_1$ to revert the ratios $R_x$ and $R_y$ to their original or lower values and consequently reverts the multi-segment downsampled video stream or digital images to their original or lower resolution.

Figure 4A:
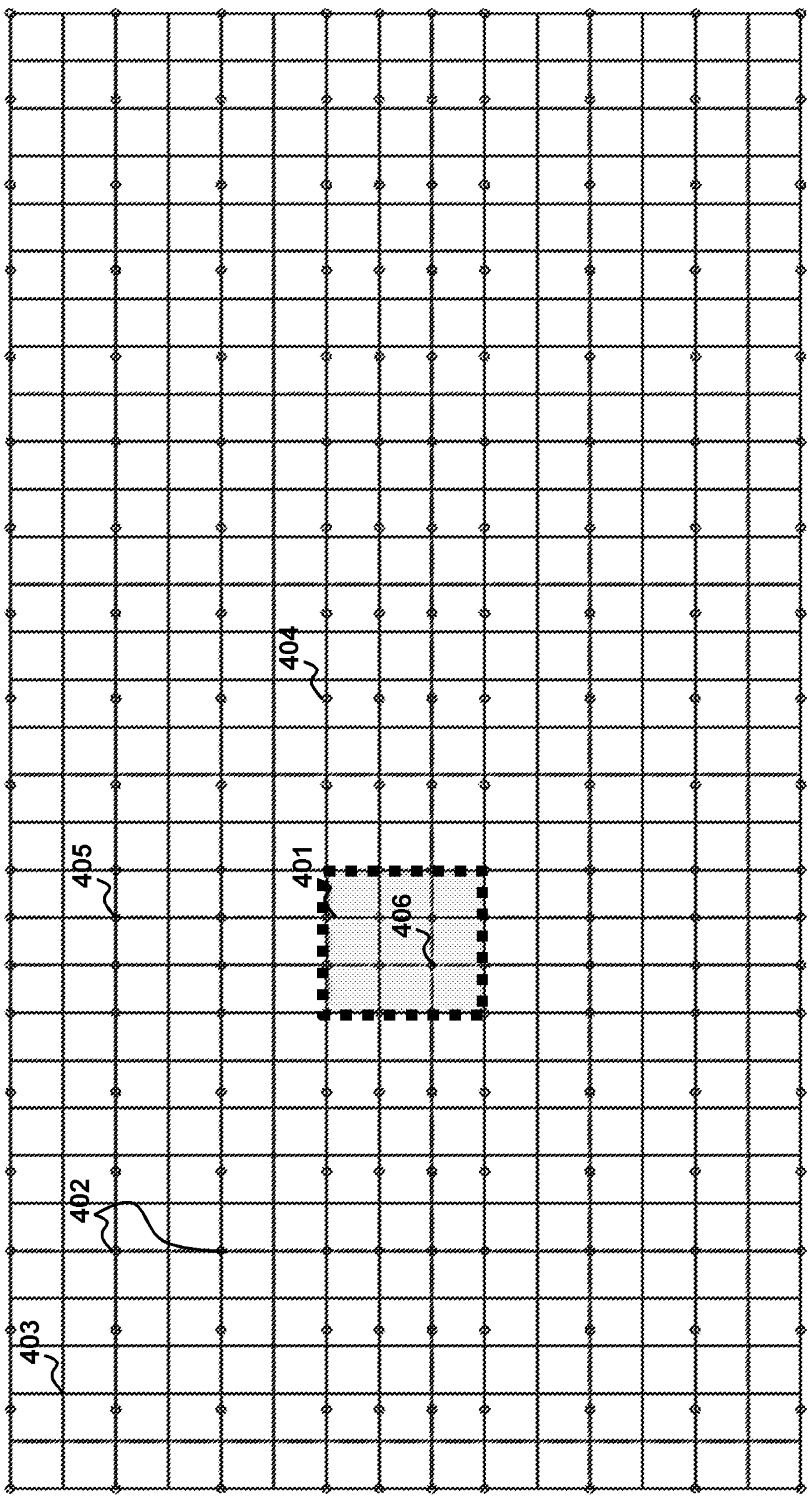
FIG. 4A shows a schematic diagram of a digital image with ROI and linearly spaced sampling points for multi-segment downsampling according to aspects of the present disclosure.

If the sampling points outside the ROI intersecting planes are placed equidistantly along the X axis, and equidistantly along the Y axis, the detail in the background is reduced uniformly within each segment. The sampling points in the downsampling stage 312 when linear spacing is used are shown in FIG. 4A. The intersections of the grid lines indicate the pixel locations 403 of the original image, and the dots indicate the sampling points 404, 405, 402. In some implementations a lower sample density may be used for the ROI if it is a "Negative Region of Interest", i.e., a portion of the image that is to be deliberately blurred or obscured.

The ROI 401 used in the example is a square. In this example, no resampling is performed in the ROI, 401 and as a result, sampling points lie exactly 406 on the pixel locations of the original image. Other sampling locations do not lie on the original pixel locations but may lie in between pixel 404 or are generally more sparsely spread 402 than the original pixels. In some embodiments the sample density may change in the X or Y direction to compensate for the ROI. As can be seen in FIG. 4A, sample 405 and its neighbors are aligned with the original pixels on the X axis but interspersed more sparsely on the Y axis. The resulting image 340 after downsampling 312 has a lower number of pixels than the original image, and this down sampled image 340 is encoded 321 to generate a bitstream according to the required bitrate.

Figure 2:
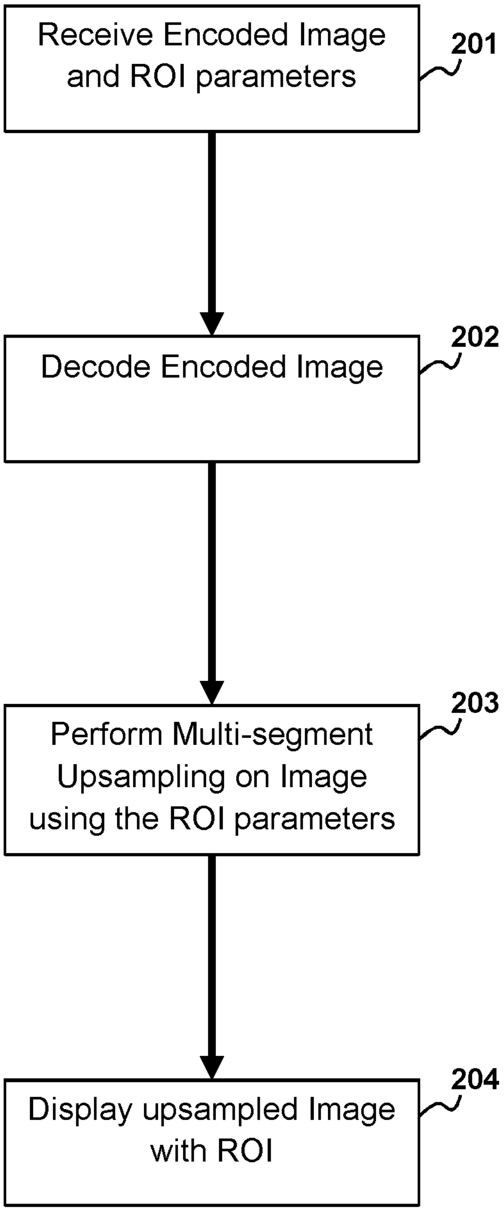
FIG. 2 depicts a flow diagram method for multi-segment upsampling after decoding according to aspects of the present disclosure.

Prior to display, the bitstream needs to be decoded and processed. The decoding and post-processing procedure in the proposed method is shown in FIG. 2. The decoder may receive the encoded data as indicated at 201. Reception may be from a Wide Area network connection (WAN) or a local data connection such as a powered universal serial bus connection (USB). Decode the received data 202 along with the ROI parameters. In some embodiments the ROI parameters may be received separately form the encoded image data or may be in a wrapper of the encoded image data. Perform multi-segment upsampling 203 on the decoded image using ROI Parameters to reconvert it to its original size. Finally display the original size decoded image on a display 204.

Figure 3B:
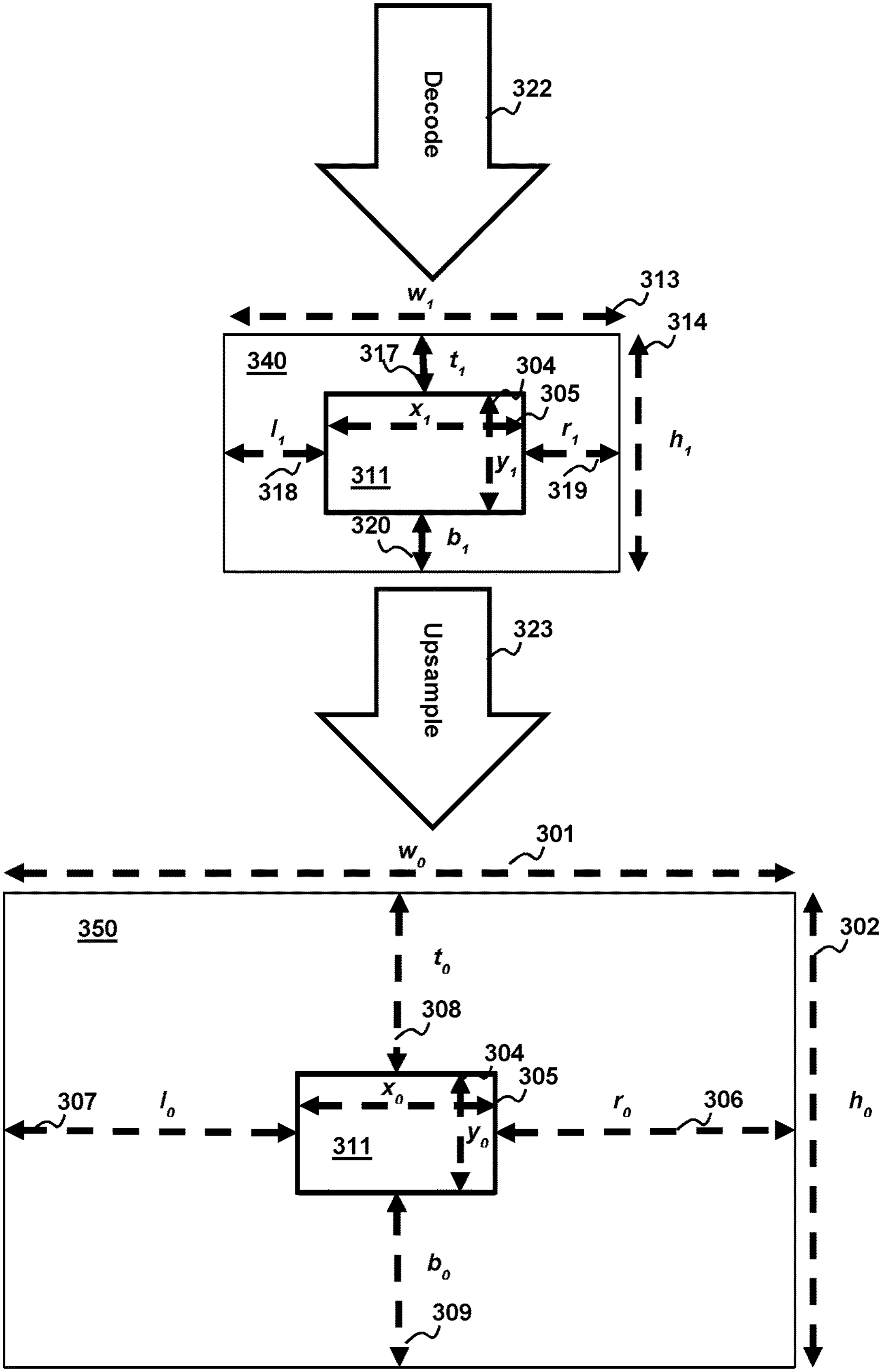
FIG. 3B depicts schematic diagram for ROI parameter determination for multi-segment upsampling according to aspects of the present disclosure.

FIG. 3B illustrates the decoding procedure. The initially encoded picture must be decoded 322 resulting in the downsampled picture 340. The downsampled 340 picture must then be upsampled 323 to produce a picture at the original size 350. The upsampling process 323 is conceptually the reverse of the downsampling process 312. During downsampling 312, the sampling density was lower for the background compared to the ROI. During upsampling 323, the sampling density is higher for the background than for the ROI.

Figure 4B:
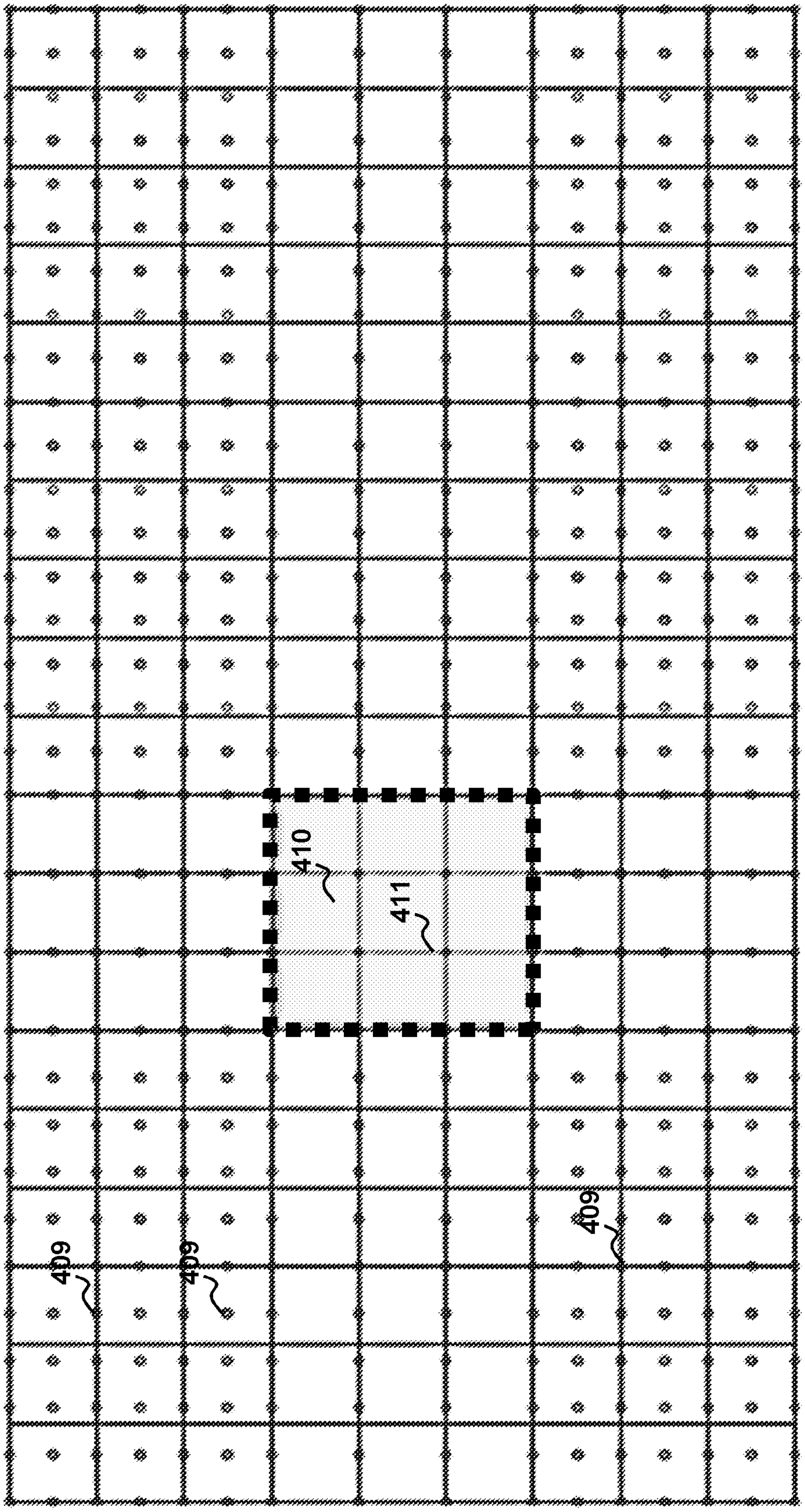
FIG. 4B shows a schematic diagram of a downsampled image with ROI and linearly spaced sampling points for multi-segment upsampling according to aspects of the present disclosure.

FIG. 4B illustrates sampling points in the upsampling stage when linear spacing is used. The same sampling method (such as bilinear interpolation) used for downscaling may be utilized for upscaling. Alternatively, different sampling methods may be used for downscaling and upscaling. As can be seen areas within the ROI 410 are not upsampled or minimally upsampled depending on the ROI parameters and operations performed during downsampling. In other words generally the upsampling points 411 in the ROI 410 lie in the original pixel locations, where the crossing grid lines represent original pixel location. Further, as sampling during the downsample operation was sparser in the corners of the image; during the upsample operation sampling in corners such as 409 will be more concentrated to compensate. It should be understood that the sampling locations during the upsampling stage may depend upon at least the location of the ROI and the type of upsampling performed.

The proposed solution can be applied to improve the details in regions of the image users typically tend to focus on, such as those containing people or text. By way of example and without limitation, the ROI could be determined automatically using pattern recognition algorithms, or it could be based on a gaze tracking apparatus, which identifies the region being viewed as will be discussed in a later section. For the latter, it might be advantageous to have a progressively increasing loss of detail, where the picture detail farther away from the gaze point is reduced to a higher degree compared to those regions closer to the gaze point. This effect can be realized by modifying the proposed method to perform downsampling and upsampling based on points that are spaced non-linearly outside the ROI along each axis.

Figure 5A:
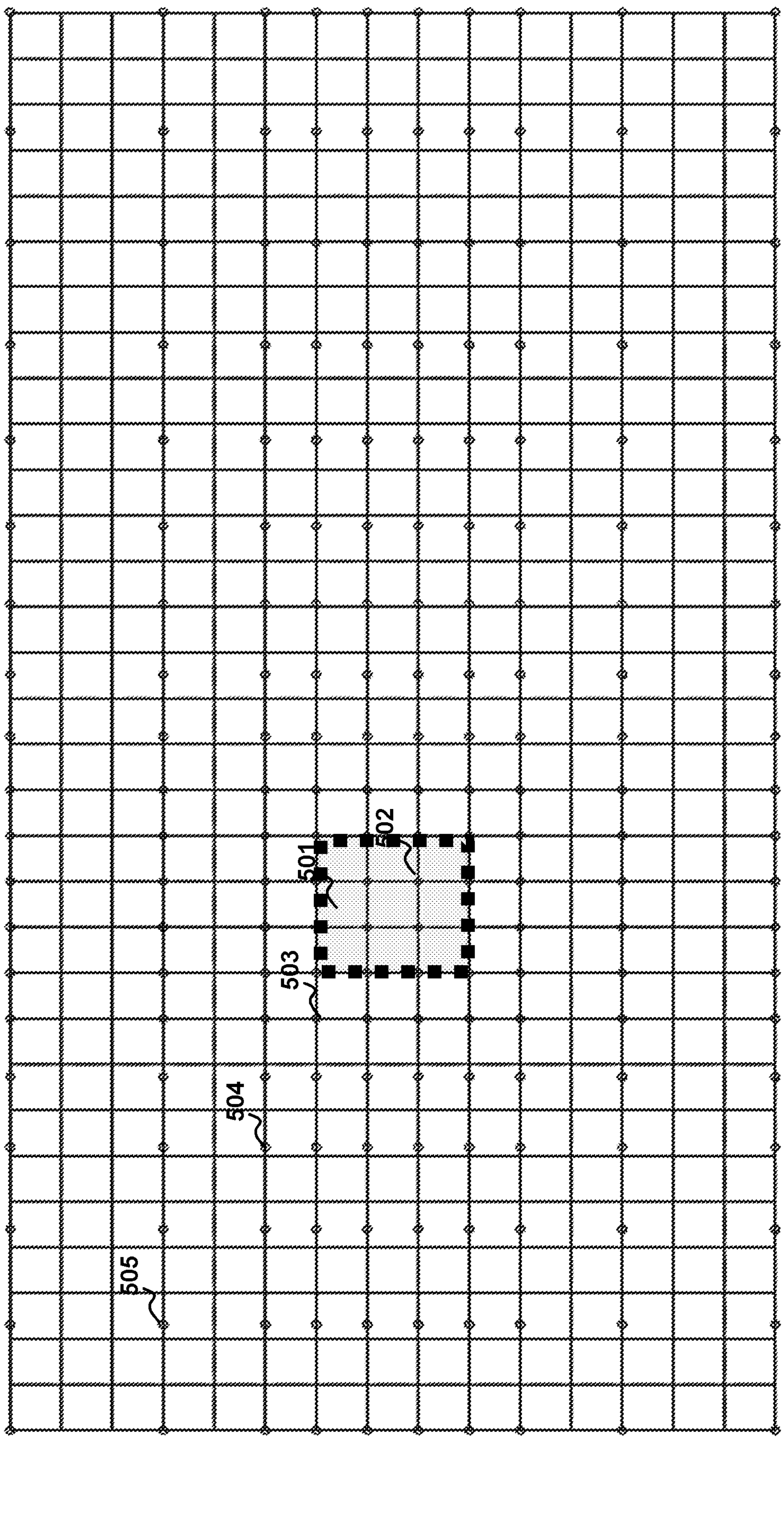
FIG. 5A shows a schematic diagram of a digital image with ROI and non-linearly spaced sampling points for multi-segment downsampling according to aspects of the present disclosure.
Figure 5B:
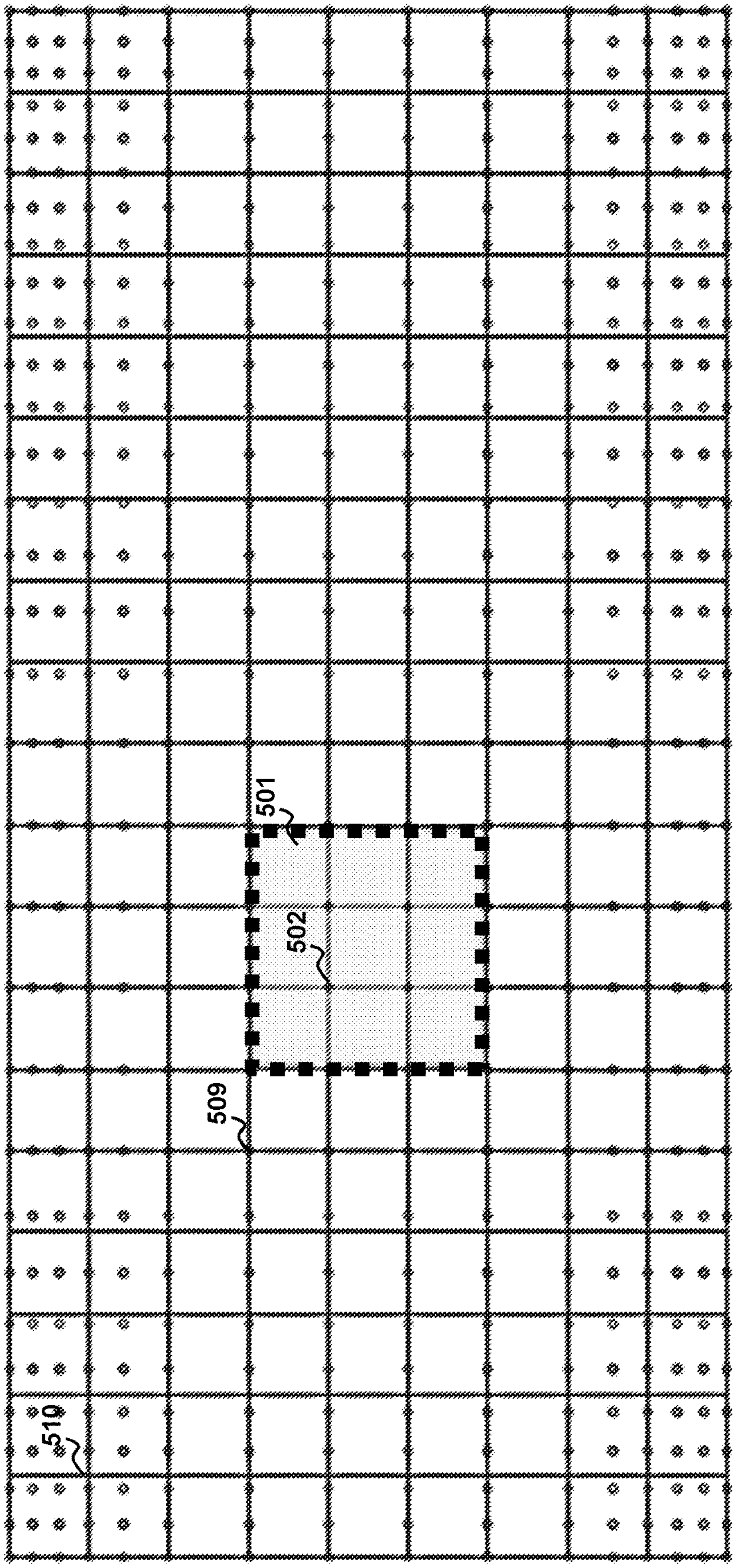
FIG. 5B shows a schematic diagram of a downsampled image with ROI and non-linearly spaced samplings for multi-segment upsampling according to aspects of the present disclosure.

The sampling points in the downsampling and upsampling stages, when non-linear spacing is used are shown in FIG. 5A and FIG. 5B respectively.

For non-linearly spaced downsampling, a function is defined to identify the sampling points along each axis. This function should have an inverse in the domain used, so that the inverse function could be used to determine the sampling points during upsampling. In the examples shown in FIGS. 5A and 5B a quadratic function is utilized for downsampling, and its inverse, a square-root function is utilized for upsampling. The effect of using the quadratic function for downsampling is a sample close to the ROI such as 503 is more closely tied to the original pixel location while samples farther from the ROI such as 504 are less closely aligned with original pixel location and the sampling density become progressively sparse as based towards edge points such as 505 that are far from the ROI 501. Sample points within the ROI such as 502 are minimally changed from their pixel locations. Similarly during upsampling the inverse is true samples at the far edge 510 are denser and the sampling density drops for sample points 509 near the ROI 501. For ROI coding using non-linearly spaced sampling points, additional ROI parameters need to be computed and passed to the decoder so that the correct function could be used to reconstruct the final image.

The proposed method can be extended to non-rectangular ROIs, such as a circle, if the ROI itself could be represented as a function. For this case, the parameters $l_0$, $t_0$, $r_0$, and $b_0$ may vary for each pixel row or column. But the process of deriving the resampling ratio and the resampling points remain the same for each pixel row and column that include the ROI. The method can also be applied to multiple ROIs with the addition of an identifier ROI_Id in the ROI parameters to specify which ROI the parameters correspond to.

Encoding

Figure 6:
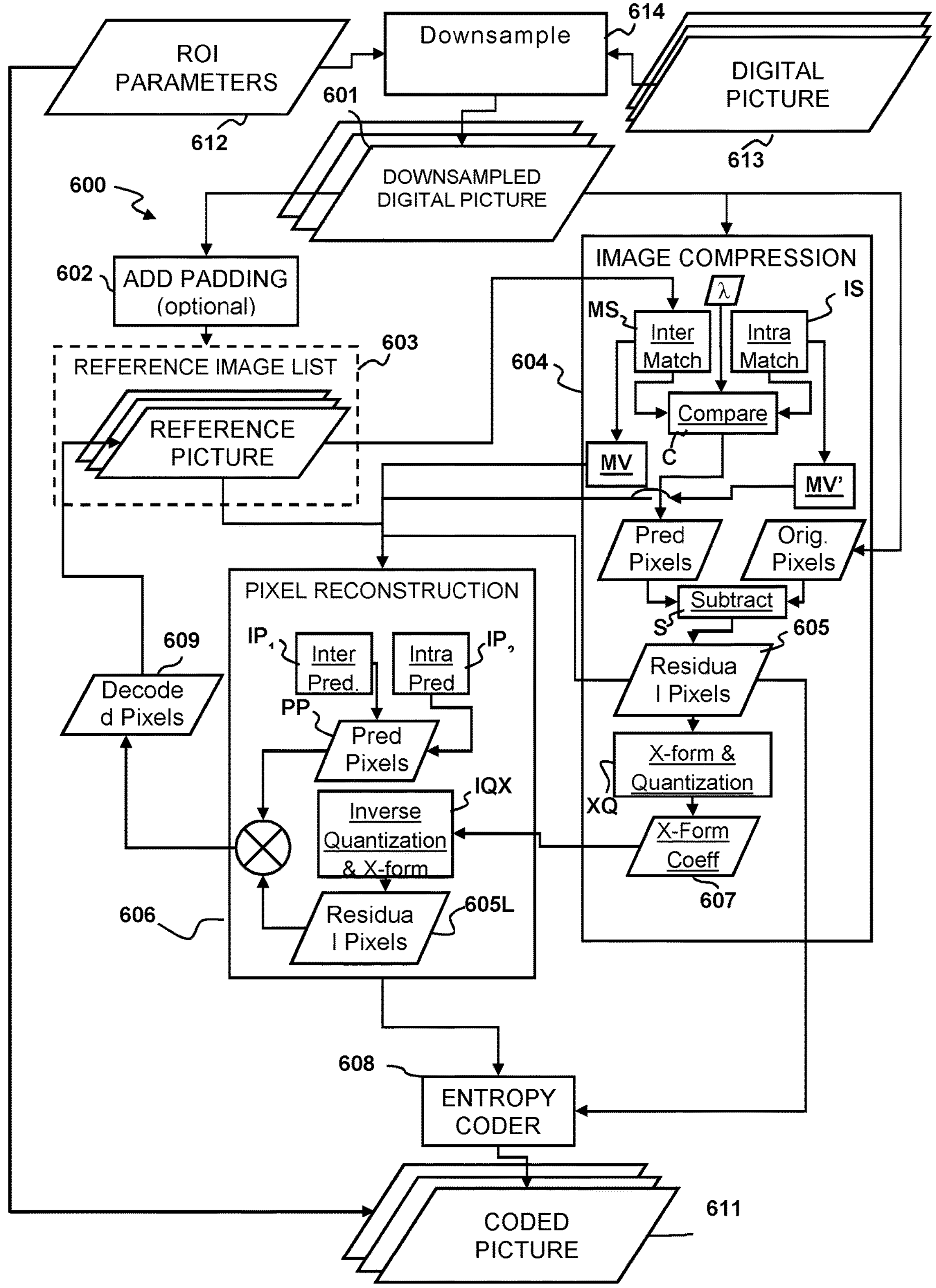
FIG. 6 illustrates a block diagram for a method for encoding a digital image with multi-segment downsampling according to aspects of the present disclosure.

The Encoding process as show in FIG. 6 initially begins with the downsampling operation described above. The system resolves the ROI parameters 612 using predictive algorithms, gaze tracking apparatus or other such methods or devices. The ROI parameters 612 are used with the set of digital pictures 613 to perform the multi-segment downsampling operation 614. The ROI parameters are preserved and encoded 608 or otherwise included with the coded pictures 611. It should be understood that each frame or picture in the set of digital pictures may have its own ROI parameters and that the ROI parameters may change from frame to frame or picture to picture. Likewise in some embodiments the set of digital pictures may without limitation be still image.

After the downsampling operation the downsampled digital pictures 601 are encoded by normal means. By way of example, and not by way of limitation, digital pictures may be encoded according to a generalized method 600. The encoder receives a plurality of digital images 601 and encodes each image. Encoding of the digital picture 601 may proceed on a section-by-section basis. The encoding process for each section may optionally involve padding 602, image compression 604 and pixel reconstruction 606. To facilitate a common process flow for both intra-coded and inter-coded pictures, all un-decoded pixels within a currently processing picture 601 may be padded with temporary pixel values to produce a padded picture, as indicated at 602. The padding may proceed, e.g., as described above in U.S. Pat. No. 8,711,933, which is incorporated herein by reference. The padded picture may be added to a list of reference pictures 603 stored in a buffer. Padding the picture at 602 facilitates the use of a currently-processing picture as a reference picture in subsequent processing during image compression 604 and pixel reconstruction 606. Such padding is described in detail in commonly-assigned U.S. Pat. No. 8,218,641, which is incorporated herein by reference.

As used herein, image compression refers to the application of data compression to digital images. The objective of the image compression 604 is to reduce redundancy of the image data for a give image 601 in order to be able to store or transmit the data for that image in an efficient form of compressed data. The image compression 604 may be lossy or lossless. Lossless compression is sometimes preferred for artificial images such as technical drawings, icons or comics. This is because lossy compression methods, especially when used at low bit rates, introduce compression artifacts. Lossless compression methods may also be preferred for high value content, such as medical imagery or image scans made for archival purposes. Lossy methods are especially suitable for natural images such as photos in applications where minor (sometimes imperceptible) loss of fidelity is acceptable to achieve a substantial reduction in bit rate.

Examples of methods for lossless image compression include, but are not limited to Run-length encoding—used as default method in PCX and as one of possible in BMP, TGA, TIFF, Entropy coding, adaptive dictionary algorithms such as LZW—used in GIF and TIFF and deflation—used in PNG, MNG and TIFF. Examples of methods for lossy compression include reducing the color space of a picture 604 to the most common colors in the image, Chroma subsampling, transform coding, and fractal compression.

In color space reduction, the selected colors may be specified in the color palette in the header of the compressed image. Each pixel just references the index of a color in the color palette. This method can be combined with dithering to avoid posterization. Chroma subsampling takes advantage of the fact that the eye perceives brightness more sharply than color, by dropping half or more of the chrominance information in the image. Transform coding is perhaps the most commonly used image compression method. Transform coding typically applies a Fourier-related transform such as a discrete cosine transform (DCT) or the wavelet transform, followed by quantization and entropy coding. Fractal compression relies on the fact that in certain images, parts of the image resemble other parts of the same image. Fractal algorithms convert these parts, or more precisely, geometric shapes into mathematical data called "fractal codes" which are used to recreate the encoded image.

The image compression 604 may include region of interest coding in which certain parts of the image 601 are encoded with higher quality than others. This can be combined with scalability, which involves encoding certain parts of an image first and others later. Compressed data can contain information about the image (sometimes referred to as meta information or metadata) which can be used to categorize, search or browse images. Such information can include color and texture statistics, small preview images and author/copyright information.

By way of example, and not by way of limitation, during image compression at 604 the encoder may search for the best way to compress a block of pixels. The encoder can search all of the reference pictures in the reference picture list 603, including the currently padded picture, for a good match. If the current picture (or subsection) is coded as an intra picture, (or subsection) only the padded picture is available in the reference list. The image compression at 604 produces a motion vector MV and transform coefficients 607 that are subsequently used along with one or more of the reference pictures (including the padded picture) during pixel reconstruction at 606.

The image compression 604 generally includes a motion search MS for a best inter prediction match, an intra search IS for a best intra prediction match, an inter/intra comparison C to decide whether the current macroblock is inter-coded or intra-coded, a subtraction S of the original input pixels from the section being encoded with best match predicted pixels to calculate lossless residual pixels 605. The residual pixels then undergo a transform and quantization XQ to produce transform coefficients 607. The transform is typically based on a Fourier transform, such as a discrete cosine transform (DCT).

The transform outputs a set of coefficients, each of which is a weighting value for a standard basis pattern. When combined, the weighted basis patterns re-create the block of residual samples. The output of the transform, a block of transform coefficients, is quantized, i.e. each coefficient is divided by an integer value. Quantization reduces the precision of the transform coefficients according to a quantization parameter (QP). Typically, the result is a block in which most or all of the coefficients are zero, with a few non-zero coefficients. Setting QP to a high value means that more coefficients are set to zero, resulting in high compression at the expense of poor decoded image quality. For a low QP value, more non-zero coefficients remain after quantization, resulting in better decoded image quality but lower compression. Conversely, for a high QP value, fewer non-zero coefficients remain after quantization, resulting in higher image compression but lower image quality.

The inter/intra comparison C, also referred to as a mode decision uses a parameter known as a Lagrange multiplier $\lambda$ that is related to QP. Basically, a cost function J is computed using a value of $\lambda$ determined from the value of QP. The encoding mode is determined based on whether the computed cost function J for inter mode coding is above or below a computed cost for intra mode coding. By way of example, the H.264/AVC codec supports a cost function $J_H$, which should be minimized by computing the actual bit consumption R for encoding the overhead (e.g., motion vectors, types) of the section and the reconstruction distortion D (measured, e.g., as a sum of absolute differences, SAD between the original and reconstructed sections). In such a case, the cost function $J_H$ is computed according to $$J_H=D+\lambda\cdot R.$$

In alternative implementations, the distortion D may be calculated differently. There are many ways to represent the distortion, for example, sum of squared differences (SSD), sum of absolute transformed differences (SATD), mean absolute difference (MAD), and the like. Those skilled in the art will recognize that for different distortion measures, the cost function has to be modified or re-tuned accordingly.

Under some circumstances, an improper encoding mode decision can trigger an unnecessary IDR or I-frame insertion. Consider an example of steaming video during online video gaming. The encoder tries to meet a target bit rate for the video stream that is generated by a game application. The target bit rate is related to the number of bits per frame. If the game is paused, the video is essentially a stream of still frames. For a still frame, the QP is low in order to meet the target bits for the frame in rate distortion optimization process. When QP is low, the mode decision selects intra coding for most sections (e.g., macroblocks) in a still frame. If the number of intra-coded sections in a frame is above a threshold the codec triggers a scene-change detection and the next frame is coded as an intra frame with extremely low QP, which requires a large number of bits to encode. This is due to the fact that extremely low values of QP (e.g., QP=1, 2) implies nearly lossless coding in this case. By way of example, and not by way of limitation, the threshold for triggering scene change detection may be about 60-80% intra MB in a frame. A sequence of still frames causes in a sequence of scene change detections even though basically the same frame is being repeated. The sequence of intra-frames can cause large and frequent spikes of bit rate usage in a bandwidth-limited communication channel.

Normally relationship between λ and QP is fixed by the codec and is the same for all pictures. According to aspects of the present disclosure, the relationship between λ and QP can be adjusted from picture to picture depending on the number of bits per section in a picture.

According to aspects of the present disclosure, the relation between λ and QP can be adapted based on the number of bits per section so that the encoding mode decision can be configured in a way that reduces the likelihood of unnecessary IDR or I-frame insertion.

According to aspects of the present disclosure, the relationship between λ and QP may be selectively adjusted during encoding, e.g., at the beginning of encoding of a video stream or the beginning of each video frame in a stream in a way that makes it more likely for the section encoding mode decision to result in an "inter" coding decision instead of an "intra" coding mode.

In some implementations it is even possible to change the λ versus QP relationship for each section if there are different size sections in a frame, e.g., as is possible in H.265. This could be beneficial, e.g., in two-pass encoding use cases since the first pass would provide more insight about the content of the picture sections so that better coding mode decisions can be made.

By way of example, and not by way of limitation, adjustment to the relationship between λ and QP may depend on the number of bits in a section (NBS), which generally depends on the target bitrate (e.g., in bits per second), the frame rate (e.g., in frames per second), and the number of sections in a frame. The number of bits in a section NBS can be calculated by dividing the target bitrate BR by the product of the frame rate FR and the number of sections per frame (NSF). By way of example, and not by way of limitation, this can be expressed as:

$$NBS=BR/(FR \cdot NSF)$$

More generally, the number of bits per section (NBS) may be more broadly expressed as $$NBS=(BPF)/(NSF),$$ where BPF is the target number of bits per frame.

This broadened expression allows for the possibility that the value of NBS could be different from frame to frame, depending, e.g., on the target bits allocated by the underlying rate control scheme. In the case of a fixed target number of bits for each frame BPF becomes BR/FR.

The number of sections (e.g., MB) per frame depends on the resolution. The change to the table can be triggered by a combination of resolution, frame rate, and bit rate. E.g., a table change would be triggered for a frame having 960 by 540 resolution, a frame rate of 30 fps, and a target rate of 8-10 Mbps or higher. For a given bitrate and frame rate a table change is less likely to be triggered if the resolution increases. For a given bitrate and resolution a table change is less likely to be triggered if the frame rate increases. For a given frame rate and resolution a table change is less likely to be triggered if the bitrate decreases.

The relationship between λ and QP is typically nonlinear. Generally, when QP is high λ is high and when QP is low λ is low. Examples of relationships between λ and QP are described in U.S. Pat. No. 9,386,317 the entire contents of which are been incorporated herein by reference.

The QP value can be adjusted depending on the target bitrate. Since QP controls bit usage in encoding, many encoding programs utilize a rate controller that adjusts QP in order to achieve a desired bitrate. The encoder receives uncompressed source data (e.g., an input video) and produces compressed output. The video coding method typically uses a QP value that affects the bit usage for encoding a video section and therefore affects the bitrate. Generally, lower QP results in a higher bitrate. A rate controller determines a QP value based on a demanded bitrate, which may be specified by an external application. The encoder uses the QP value determined by the rate controller and determines the actual resulting bit usage and bit rate. The rate controller can use the actual bit rate to adjust the QP value in a feedback loop.

A relationship between the bitrate and the value of the QP depends partly on the complexity of the image being. The bitrate versus QP relationship can be expressed in terms of a set of curves with different curves for different levels of complexity. The heart of the algorithm implemented by the rate controller is a quantitative model describing a relationship between QP, actual bitrate and some measure of complexity. The relevant bitrate and complexity are generally associated only with the differences between source pixels and predicted pixels (often referred to as residuals) because the quantization parameter QP can only influence the detail of information carried in the transformed residuals.

Complexity generally refers to amount of spatial variation within a picture or part of the picture. On a local level, e.g., block or macroblock level, the spatial variation may be measured by the variance of the pixel values within the relevant section. However, for a video sequence, complexity may also relate to the temporal variation of a scene of a sequence of images. For example, a video sequence consists of one object having substantial spatial variation that translates slowly across the field of view, may not require very many bits because temporal prediction can easily capture the motion using a single reference picture and a series of motion vectors. Although it is difficult to define an inclusive video complexity metric that is also easy to calculate, the Mean Average Difference (MAD) of the prediction error (difference between source pixel value and predicted pixel value) is often used for this purpose.

It is noted that the quantization parameter QP may be determined from multiple factors including, but not limited to the picture type of the source picture, a complexity of the source picture, an estimated target number of bits and an underlying rate distortion model. For example, QP may be determined on a section-by-section basis using a variation for a section of the currently encoding picture, e.g., a section (e.g., MB) variance. Alternatively, QP for a currently encoding section may be determined using an actual bit count for encoding a co-located section (e.g., MB) in a previous frame. Examples of such QP level calculations are described, e.g., in commonly assigned U.S. Patent Application Publication No. 2011/0051806, now U.S. Pat. No. 8,879,623 to Hung-Ju Lee, which is incorporated herein by reference.

Motion search and prediction depend on the type of picture being encoded. Referring again to FIG. 6, if an intra picture is to be coded, the motion search MS and inter/intra comparison C are turned off. However, in embodiments of the present invention, since the padded picture is available as a reference, these functions are not turned off. Consequently, the image compression 604 is the same for intra-coded pictures and inter-coded pictures.

The motion search MS may generate a motion vector MV by searching the picture 601 for a best matching block or macroblock for motion compensation as is normally done as part of pixel reconstruction for an inter-coded picture. If the current picture 601 is an intra-coded picture, by contrast, existing codecs typically do not allow prediction across pictures. Instead all motion compensation is normally turned off for an intra picture (e.g., I-frame) and the picture coded by generating transform coefficients and performing pixel prediction. In some implementations, however, an intra picture may be used to do inter prediction by matching a section in the current picture to another offset section within that same picture. The offset between the two sections may be coded as a motion vector MV' that can be used that for pixel reconstruction at 606. By way of example, the encoder may attempt to match a block or macroblock in an intra picture with some other offset section in the same picture then code the offset between the two as a motion vector. The codec's ordinary motion vector compensation for an "inter" picture may then be used to do motion vector compensation on an "intra" picture. Certain existing codecs have functions that can convert an offset between two blocks or macroblocks into a motion vector, which can be followed to do pixel reconstruction at 606. However, these functions are conventionally turned off for encoding of intra pictures. In embodiments of the present invention, the codec may be instructed not to turn off such "inter" picture functions for encoding of intra pictures.

As used herein, pixel reconstruction refers to a technique for describing a picture in terms of the transformation of a reference image to a currently processing image. In general, the pixel reconstruction 606 acts as a local decoder within the encoder implementing the encoding process 600. Specifically, the pixel reconstruction 606 includes inter prediction IP1 and (optionally) intra prediction IP2 to get predicted pixels PP using the motion vector MV or MV' from the image compression 604 and reference pixels from a picture in the reference list. Inverse quantization and inverse transformation IQX using the transform coefficients 607 from the image compression 604 produce lossy residual pixels 605L which are added to the predicted pixels PP to generate decoded pixels 609. The decoded pixels 609 are inserted into the reference picture and are available for use in image compression 604 and pixel reconstruction 606 for a subsequent section of the currently-processing picture 601. After the decoded pixels have been inserted, un-decoded pixels in the reference picture may undergo padding 602.

In some encoder implementations, if the current picture is intra coded, the inter-prediction portions of pixel reconstruction 606 are turned off because there are no other pictures that can be used for pixel reconstruction. Alternatively, pixel reconstruction may be performed on any picture 601 independent of whether a particular picture is to be inter-coded or intra-coded. In some implementations, the encoder implementing may be modified to add the padded picture to the reference picture list 603 and the inter-prediction portions of the pixel reconstruction 606 are not turned off, even if the currently processing image is to be intra coded. As a result, the process flow for both inter coded sections and intra coded sections is the same during pixel reconstruction 606. The only major difference is the selection of the reference picture to be used for encoding. It is noted that in some implementations, motion-compensation need not be performed on all pictures, and padded pictures need not be added to the reference picture list.

By way of example, and not by way of limitation, in one type of pixel reconstruction, known as block pixel reconstruction (BMC), each image may be partitioned into blocks of pixels (e.g. macroblocks of 16×16 pixels). Each block is predicted from a block of equal size in the reference frame. The blocks are not transformed in any way apart from being shifted to the position of the predicted block. This shift is represented by a motion vector MV. To exploit the redundancy between neighboring block vectors, (e.g. for a single moving object covered by multiple blocks) it is common to encode only the difference between a current and previous motion vector in a bit-stream. The result of this differencing process is mathematically equivalent to global pixel reconstruction capable of panning. Further down the encoding pipeline, the method 600 may optionally use entropy coding 608 to take advantage of the resulting statistical distribution of the motion vectors around the zero vector to reduce the output size. In some embodiments the ROI parameters 612 are included with the digital pictures 611 as part of the network wrapper in the Network Abstraction Layer (NAL). In other embodiments the ROI parameters 612 may be included in the digital pictures during entropy coding 608.

It is possible to shift a block by a non-integer number of pixels, which is called sub-pixel precision. The in-between pixels are generated by interpolating neighboring pixels. Commonly, half-pixel or quarter pixel precision is used. The computational expense of sub-pixel precision is much higher due to the extra processing required for interpolation and on the encoder side, a much greater number of potential source blocks to be evaluated.

Block pixel reconstruction divides up a currently encoding image into non-overlapping blocks, and computes a pixel reconstruction vector that indicates where those blocks come from in a reference image. The reference blocks typically overlap in the source frame. Some video compression algorithms assemble the current image out of pieces of several different reference images in the reference image list 603.

The result of the image compression 604 and pixel reconstruction 606 and (optionally) entropy coding 608 is a set of data 611 referred to for convenience as a coded picture. The motion vector MV, (and/or intra prediction mode motion vector MV') and transform coefficients 607 may be included in the coded picture 611. Once a digital picture or other form of streaming data has been encoded, the encoded data may be transmitted, decoded, and then upsampled using the ROI parameters.

Decoding

Figure 7:
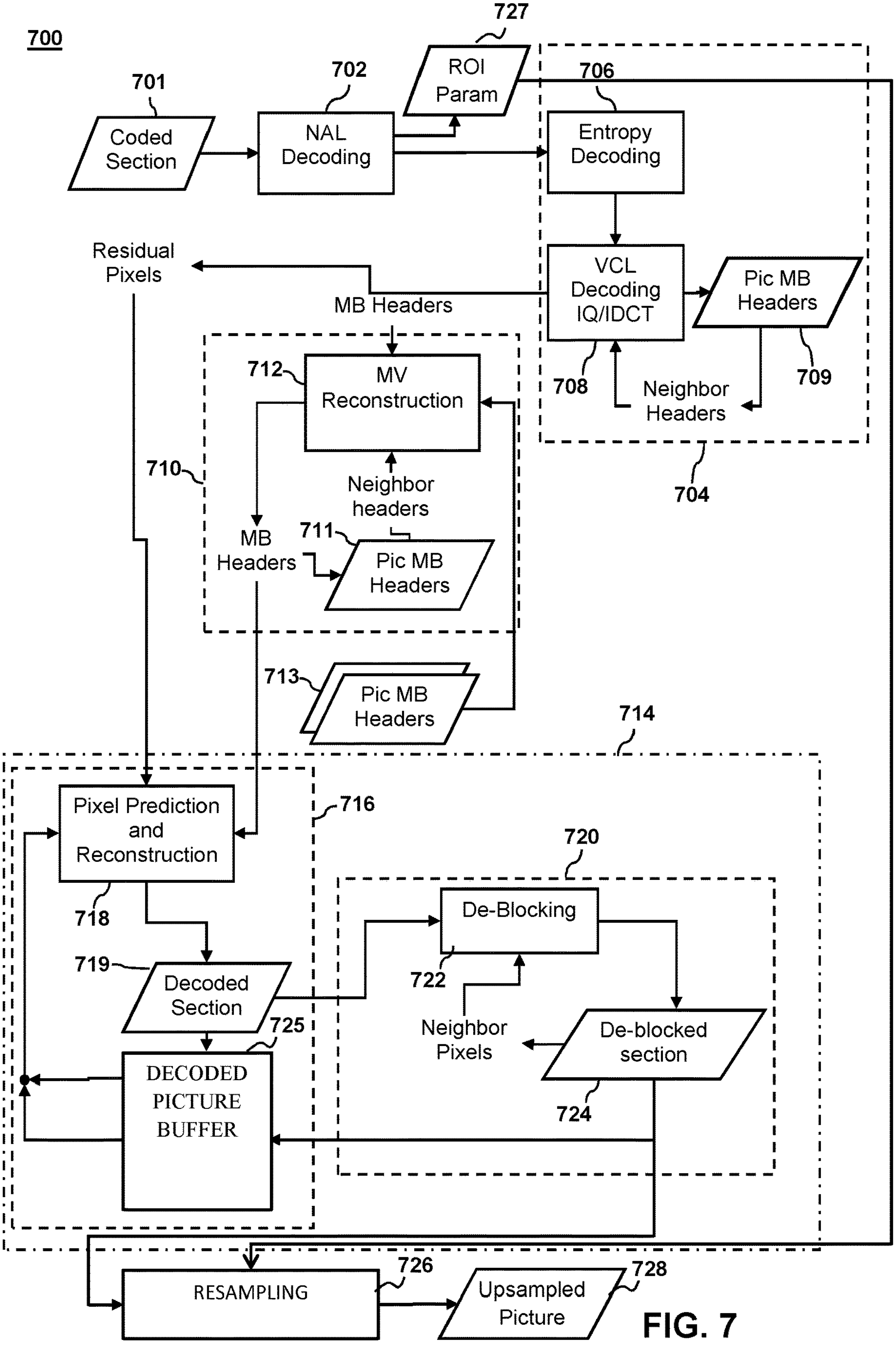
FIG. 7 illustrates a block diagram for a method for decoding a downsampled imaged with ROI and multi-segment upsampling according to aspects of the present disclosure.

FIG. 7 illustrates an example of a possible process flow in a method 700 for decoding of down-sampled streaming data 701 with ROI parameters that may be used in conjunction with aspects of the present disclosure. This particular example shows the process flow for video decoding, e.g., using the AVC (H.264) standard. The coded streaming data 701 may initially be stored in a buffer. Where coded streaming data 701 (e.g., a video data bitstream) has been transferred over a network, e.g., the Internet, the data 701 may initially undergo a process referred to as network abstraction layer (NAL) decoding, indicated at 702. The Network Abstraction Layer (NAL) is a part of streaming data standards, such as the H.264/AVC and HEVC video coding standards. The main goal of the NAL is the provision of a "network-friendly" representation of streaming data for "conversational" (e.g., video telephony) and "non-conversational" (storage, broadcast, or streaming) applications.

NAL decoding may remove from the data 701 information added to assist in transmitting the data. Such information, referred to as a "network wrapper" may identify the data 201 as video data or indicate a beginning or end of a bitstream, bits for alignment of data, and/or metadata about the video data itself.

In addition, by way of example, the network wrapper may include information about the data 701 including, e.g., resolution, picture display format, color palette transform matrix for displaying the data, information on the number of bits in each picture, slice or macroblock, as well as information used in lower level decoding, e.g., data indicating the beginning or ending of a slice. This information may be used to determine the number of macroblocks to pass to each of the task groups in a single section. Due to its complexity, NAL decoding is typically done on a picture and slice level. The smallest NAL buffer used for NAL decoding is usually slice sized. The example illustrated in FIG. 7 is described in terms of macroblocks and the AVC (H.264) standard. However, these are not limiting features of aspects of the present disclosure. For example, in the latest H.265 (HEVC) standard, there is no macroblock concept. Instead, more flexible Coding Unit (CU), Prediction Unit, (PU), Transform Unit (TU) concepts are introduced. Aspects of the present disclosure may operate in conjunction with such coding standards. By way of example, and not by way of limitation, the network wrapper may include ROI parameters 727. Alternatively the ROI parameters may be received separately or may be unencoded.

In some embodiments, after NAL decoding at 702, the remaining decoding illustrated in FIG. 7 may be implemented in three different thread groups or task groups referred to herein as video coding layer (VCL) decoding 704, motion vector (MV) reconstruction 710 and picture reconstruction 714. The picture reconstruction task group 714 may include pixel prediction and reconstruction 716 and post processing 720. In some embodiments of the present invention, these tasks groups may be chosen based on data dependencies such that each task group may complete its processing of all the macroblocks in a picture (e.g., frame or field) or section before the macroblocks are sent to the next task group for subsequent processing.

Certain coding standards may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (IDCT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data a process known as inverse quantization (IQ) is used before performing the inverse transform from the frequency domain to the spatial domain. The data dependencies for the VCL IQ/IDCT decoding process 704 are typically at the macroblock level for macroblocks within the same slice. Consequently results produced by the VCL decoding process 704 may be buffered at the macroblock level.

VCL decoding 704 often includes a process referred to as Entropy Decoding 706, which is used to decode the VCL syntax. Many codecs, such as AVC(H.264), use a layer of encoding referred to as entropy encoding. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability. AVC(H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC(H.264) bitstreams. Decoding the entropy layer of AVC(H.264)-coded data streams can be computationally intensive and may present challenges for devices that decode AVC (H.264)-coded bitstreams using general purpose microprocessors. For this reason, many systems use a hardware decoder accelerator.

In addition to Entropy Decoding 706, the VCL decoding process 704 may involve inverse quantization (IQ) and/or inverse discrete cosine transformation (IDCT) as indicated at 708. These processes may decode the headers 709 and data from macroblocks. The decoded headers 709 may be used to assist in VCL decoding of neighboring macroblocks. In embodiments where the ROI parameters are encoded the decoded headers may contain ROI parameters.

VCL decoding 704 may be implemented at a macroblock level data dependency frequency. Specifically, different macroblocks within the same slice may undergo VCL decoding in parallel and the results may be sent to the motion vector reconstruction task group 710 for further processing.

Subsequently, all macroblocks in the picture or section may undergo motion vector reconstruction 710. The MV reconstruction process 710 may involve motion vector reconstruction 712 using headers from a given macroblock 711 and/or co-located macroblock headers 713. A motion vector describes apparent motion within a picture. Such motion vectors allow reconstruction of a picture (or portion thereof) based on knowledge of the pixels of a prior picture and the relative motion of those pixels from picture to picture. Once the motion vector has been recovered pixels may be reconstructed at 716 using a process based on residual pixels from the VCL decoding process 704 and motion vectors from the MV reconstruction process 710. The data dependency frequency (and level of parallelism) for the MV depends on whether the MV reconstruction process 710 involves co-located macroblocks from other pictures. For MV reconstruction not involving co-located MB headers from other pictures the MV reconstruction process 710 may be implemented in parallel at the slice level or picture level. For MV reconstruction involving co-located MB headers the data dependency frequency is at the picture level and the MV reconstruction process 710 may be implemented with parallelism at the slice level.

The results of motion vector reconstruction 710 are sent to the picture reconstruction task group 714, which may be parallelized on a picture frequency level. Within the picture reconstruction task group 714 all macroblocks in the picture or section may undergo pixel prediction and reconstruction 716 in conjunction with de-blocking 720. The pixel prediction and reconstruction task 716 and the de-blocking task 720 may be parallelized to enhance the efficiency of decoding. These tasks may be parallelized within the picture reconstruction task group 714 at a macroblock level based on data dependencies. For example, pixel prediction and reconstruction 716 may be performed on one macroblock and followed by de-blocking 720. Reference pixels from the decoded picture obtained by de-blocking 720 may be used in pixel prediction and reconstruction 716 on subsequent macroblocks. Pixel prediction and reconstruction 718 produces decoded sections 719 (e.g. decoded blocks or macroblocks) that include neighbor pixels which may be used as inputs to the pixel prediction and reconstruction process 718 for a subsequent macroblock. The data dependencies for pixel prediction and reconstruction 716 allow for a certain degree of parallel processing at the macroblock level for macroblocks in the same slice.

The post processing task group 720 may include a de-blocking filter 722 that is applied to blocks in the decoded section 719 to improve visual quality and prediction performance by smoothing the sharp edges which can form between blocks when block coding techniques are used. The de-blocking filter 722 may be used to improve the appearance of the resulting de-blocked sections 724.

The decoded section 719 or de-blocked sections 724 may provide neighboring pixels for use in de-blocking a neighboring macroblock. In addition, decoded sections 719 including sections from a currently decoding picture may provide reference pixels for pixel prediction and reconstruction 718 for subsequent macroblocks. It is during this stage that pixels from within the current picture may optionally be used for pixel prediction within that same current picture as described above, independent of whether the picture (or subsections thereof) is inter-coded or intra-coded. De-blocking 720 may be parallelized on a macroblock level for macroblocks in the same picture.

The decoded sections 719 produced before post processing 720 and the post-processed sections 724 may be stored in the same buffer, e.g., the decoded picture buffer 725 depending on the particular codec involved. It is noted that de-blocking is a post processing filter in H.264. Because H.264 uses pre-de-blocking macroblock as reference for neighboring macroblocks intra prediction and post-de-blocking macroblocks for future picture macroblocks inter prediction. Because both pre- and post-de-blocking pixels are used for prediction, the decoder or encoder has to buffer both pre-de-blocking macroblocks and post-de-blocking macroblocks. For most low cost consumer applications, pre-de-blocked pictures and post-de-blocked pictures share the same buffer to reduce memory usage. For standards that pre-date H.264, such as MPEG2 or MPEG4 except MPEG4 part 10, (note: H.264 is also called MPEG4 part 10), only pre-post-processing macroblocks (e.g., pre-de-blocking macroblocks) are used as reference for other macroblock prediction. In such codecs, a pre-filtered picture may not share the same buffer with a post filtered picture. After processing, the picture is resampled 726 using the ROI parameters 727. An upsampled picture 728 with high quality ROI may be produced and stored in an output picture buffer for display.

Thus, for H.264, after pixel decoding, the decoded section 719 is saved in the decoded picture buffer 725. Later, the post processed sections 724 replace the decoded sections 719 in the decoded picture buffer 725 before upsampling 726. For non-H.264 cases, the decoder only saves decoded sections 719 in the decoded picture buffer 725. The upsampling 726 is done at display time and the upsampled output 728 may not share the same buffer as the decoded picture buffer 725. Information about encoder/decoder programs may be found in published application 2018/0007362, the contents of which are incorporated by reference.

ROI Detection

There are a number of techniques for eye tracking, also known as gaze tracking. Techniques for eye gaze tracking and selective rendering compression are described in published application 2017/0285736, the contents of which are incorporated by reference herein. Some of these techniques determine a user's gaze direction from the orientation of the pupils of the user's eyes. Some known eye gaze tracking techniques involve illuminating the eyes by emitting light from one or more light sources and detecting reflections of the emitted light off of the corneas with a sensor. Typically, this is accomplished using invisible light sources in the infrared range and capturing image data (e.g., images or video) of the illuminated eyes with an infrared sensitive camera. Image processing algorithms are then used to analyze the image data to determine eye gaze direction.

Generally, eye tracking image analysis takes advantage of characteristics distinctive to how light is reflected off of the eyes to determine eye gaze direction from the image. For example, the image may be analyzed to identify eye location based on corneal reflections in the image data, and the image may be further analyzed to determine gaze direction based on a relative location of the pupils in the image.

Two common gaze tracking techniques for determining eye gaze direction based on pupil location are known as Bright Pupil tracking and Dark Pupil tracking. Bright Pupil tracking involves illumination of the eyes with a light source that is substantially in line with the optical axis of the camera, causing the emitted light to be reflected off of the retina and back to the camera through the pupil. The pupil presents in the image as an identifiable bright spot at the location of the pupil, similar to the red eye effect which occurs in images during conventional flash photography. In this method of gaze tracking, the bright reflection from pupil itself helps the system locate the pupil if contrast between pupil and iris is not enough.

Dark Pupil tracking involves illumination with a light source that is substantially off line from the optical axis of the camera, causing light directed through the pupil to be reflected away from the optical axis of the camera, resulting in an identifiable dark spot in the image at the location of the pupil. In alternative Dark Pupil tracking systems, an infrared light source and cameras directed at eyes can look at corneal reflections. Such camera based systems track the location of the pupil and corneal reflections which provides parallax due to different depths of reflections gives additional accuracy.

Figure 8A:
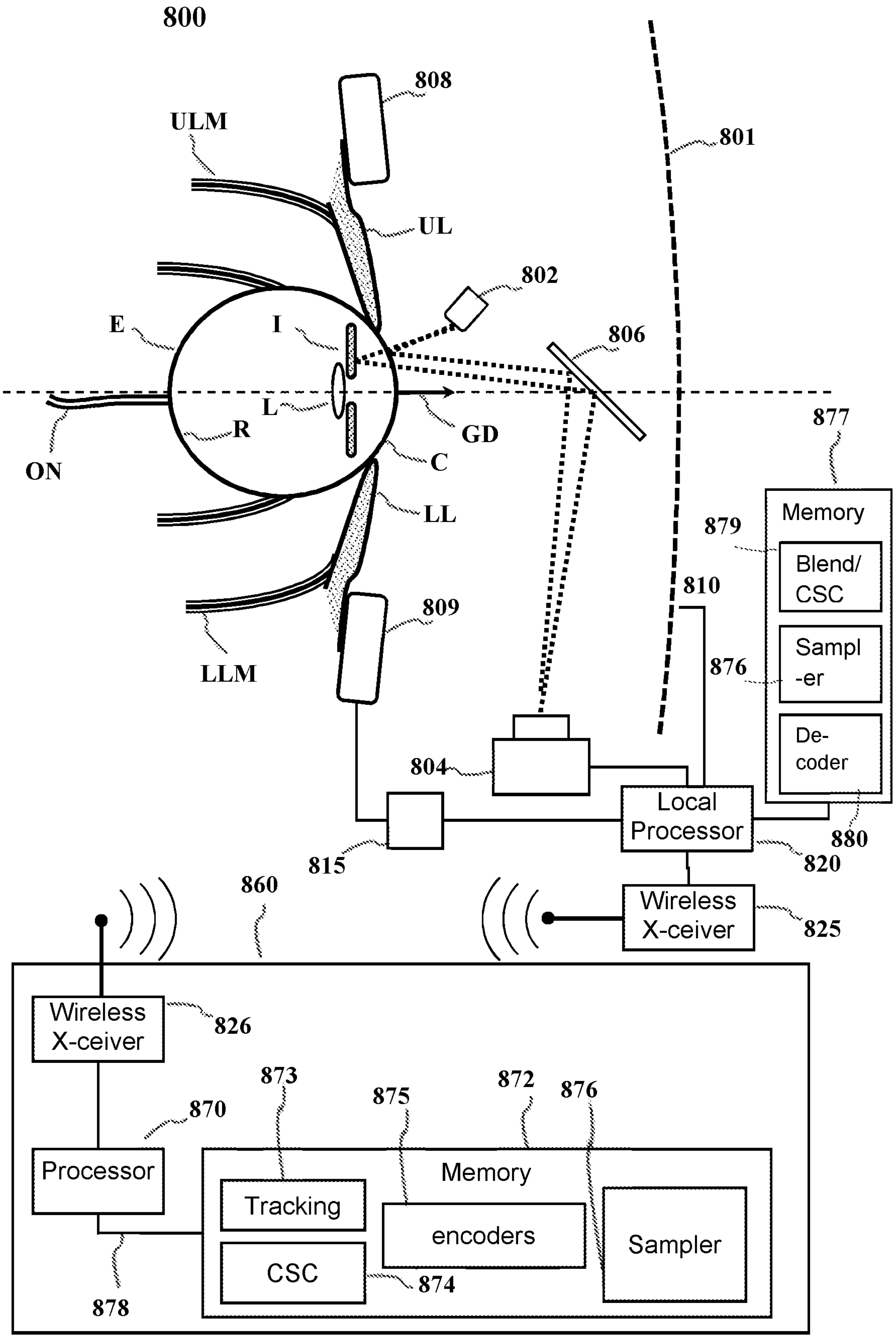
FIG. 8A-8B are schematic diagrams illustrating gaze tracking within the context of aspects of the present disclosure.

FIG. 8A depicts an example of a dark pupil gaze tracking system 800 that may be used in the context of the present disclosure. The gaze tracking system tracks the orientation of a user's eye E relative to a display screen 801 on which visible images are presented. While a display screen is used in the example system of FIG. 8A, certain alternative embodiments may utilize an image projection system capable of projecting images directly into the eyes of a user. In these embodiments, the user's eye E would be tracked relative to the images projected into the user's eyes. In the example of FIG. 8A, the eye E gathers light from the screen 801 through a variable iris I and a lens L projects an image on the retina R. The opening in the iris is known as the pupil. Muscles control rotation of the eye E in response to nerve impulses from the brain. Upper and lower eyelid muscles ULM, LLM respectively control upper and lower eyelids UL, LL in response to other nerve impulses.

Light sensitive cells on the retina R generate electrical impulses that are sent to the user's brain (not shown) via the optic nerve ON. The visual cortex of the brain interprets the impulses. Not all portions of the retina R are equally sensitive to light. Specifically, light-sensitive cells are concentrated in an area known as the fovea.

The illustrated image tracking system includes one or more infrared light sources 802, e.g., light emitting diodes (LEDs) that direct non-visible light (e.g., infrared light)

toward the eye E. Part of the non-visible light reflects from the cornea C of the eye and part reflects from the iris. The reflected non-visible light is directed toward a suitable sensor 804 (e.g., an infrared camera) by a wavelength-selective mirror 806. The mirror transmits visible light from the screen 801 but reflects the non-visible light reflected from the eye.

The sensor 804 is preferably an image sensor, e.g., a digital camera that can produce an image of the eye E which may be analyzed to determine a gaze direction GD from the relative position of the pupil. This image may be produced with a local processor 820 or via the transmission of the obtained gaze tracking data to a remote computing device 860. The local processor 820 may be configured according to well-known architectures, such as, e.g., single-core, dual-core, quad-core, multi-core, processor-coprocessor, cell processor, and the like. The image tracking data may be transmitted between the sensor 804 and the remote computing device 860 via a wired connection (not shown), or wirelessly between a wireless transceiver 825 included in the eye tracking device 810 and a second wireless transceiver 826 included in the remote computing device 860. The wireless transceivers may be configured to implement a local area network (LAN) or personal area network (PAN), via a suitable network protocol, e.g., Bluetooth, for a PAN.

The gaze tracking system 800 may also include an upper sensor 808 and lower sensor 809 that are configured to be placed, for example, respectively above and below the eye E. Sensors 808 and 809 may be independent components, or may alternatively be part of a component 810 worn on the user's head that may include, but is not limited to, any combination of the sensor 804, local processor 820, or inertial sensor 815 described below. In the example system shown in FIG. 1A, sensors 808 and 809 are capable of collecting data regarding the electrical impulses of the nervous system and/or the movement and/or vibration of the muscular system from those areas surrounding the eye E. This data may include for example, electrophysiological and/or vibrational information of the muscles and/or nerves surrounding the eye E as monitored by the upper sensor 808 and lower sensor 809. The electrophysiological information collected by sensors 808 and 809 may include, for example, electroencephalography (EEG), electromyography (EMG), or evoked potential information collected as a result of nerve function in the area(s) surrounding the eye E. Sensors 808 and 809 may also be capable of collecting, for example, mechanomyogram or surface electromyogram information as a result of detecting the muscular vibrations or twitches of the muscles surrounding the eye E. The sensors 808 may also be capable of collecting information related to a motion sickness response, including for example, heart rate data, electrocardiography (ECG) or Galvanic skin response data. The data collected by sensors 808 and 809 may be delivered with the image tracking data to the local processor 820 and/or the remote computing device 860 as described above.

The gaze tracking system 800 may also be capable of tracking a user's head. Head tracking may be performed by an inertial sensor 815 capable producing signals in response to the position, motion, orientation or change in orientation of the user's head. This data may be sent to the local processor 820 and/or transmitted to the remote computing device 860. The inertial sensor 815 may be an independent component, or may alternatively be part of a component 810 worn on the user's head that may include, but is not limited to, any combination of the sensor 804, local processor 820, or sensors 808 and 809 described above. In alternative embodiments, head tracking may be performed via the tracking of light sources on the component 810. The gaze tracking system 800 may also include one or more memory units 877 (e.g., random access memory (RAM), dynamic random access memory (DRAM), Read only memory (ROM) and the like.

The local processor 820 may be configured to receive encoded data from the network connection 825. The local processor 820 may be operatively coupled to the one or more memory units 877 and configured to execute one or more programs stored on the memory units 877. The execution of such programs may cause the system to decode a video stream from the remote computing device 860 and generate video with a high fidelity ROI for display on the display 801. By way of example and not by way of limitation the programs may include a Blender/Conversion Space Configuration program 879, an up-sampler/down-sampler program 876 and a decoder program. 880.

The remote computing device 860 may be configured to operate in coordination with the eye tracking device 810 and the display screen 801, in order to perform eye gaze tracking and determine lighting conditions in accordance with aspects of the present disclosure. The computing device 860 may include one or more processor units 870, which may be configured according to well-known architectures, such as, e.g., single-core, dual-core, quad-core, multi-core, processor-coprocessor, cell processor, and the like. The computing device 860 may also include one or more memory units 872 (e.g., random access memory (RAM), dynamic random access memory (DRAM), read-only memory (ROM), and the like).

The processor unit 870 may execute one or more programs, portions of which may be stored in the memory 872, and the processor 870 may be operatively coupled to the memory 872, e.g., by accessing the memory via a data bus 878. The programs may be configured to perform eye gaze tracking and determine lighting conditions for the system 800. By way of example, and not by way of limitation, the programs may include gaze tracking programs 873, the execution of which may cause the system 800 to track a user's gaze, e.g., as discussed above, Color space conversion programs (CSC) 874 that convert the video frame stream to a form that can be presented by a display device, Encoder programs 875, and video stream up-sampler/down-sampler programs 876 the execution of which encodes a stream video frames with down-sampled sections and selected original resolution sections of the video frames to be sent to the display where the encoded video frames are decoded and the down-sampled section are upsampled before display.

By way of example, and not by way of limitation, the gaze tracking programs 873 may include processor executable instructions which cause the system 800 to determine one or more gaze tracking parameters of the system 800 from eye tracking data gathered with the image sensor 804 and eye movement data gathered from the upper and lower sensors 808 and 809, respectively, while light is emitted from the lighting source 802. The gaze tracking programs 873 may also include instructions which analyze images gathered with the image sensor 804 in order to detect a presence of a change in lighting conditions.

Figure 8B:
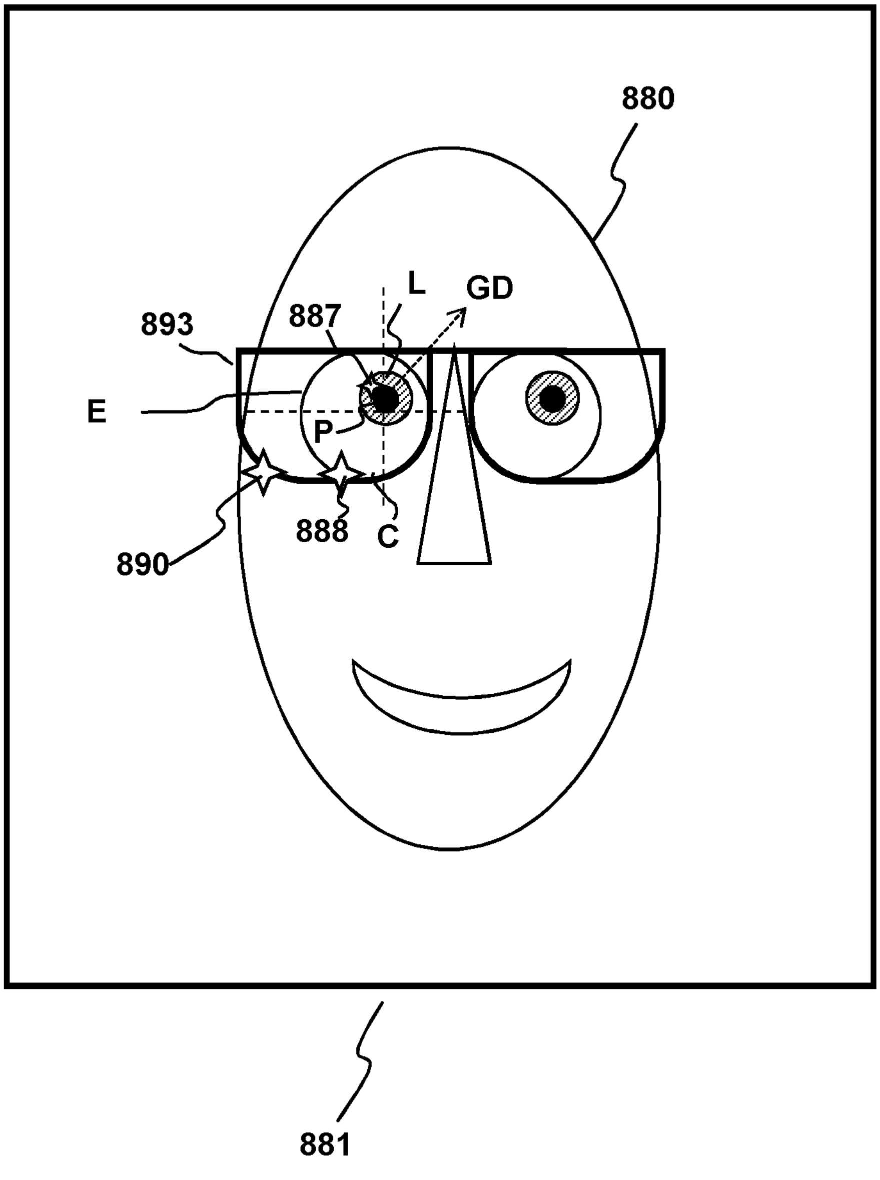

As seen in FIG. 8B, the image 881 showing a user's head H may be analyzed to determine a gaze direction GD from the relative position of the pupil. For example, image analysis may determine a 2-dimensional offset of the pupil P from a center of the eye E in the image. The location of the pupil relative to the center may be converted to a gaze direction relative to the screen 801, by a straightforward geometric computation of a three-dimensional vector based on the known size and shape of the eyeball. The determined gaze direction GD is capable of showing the rotation and acceleration of the eye E as it moves relative to the screen 801.

As also seen in FIG. 1B, the image may also include reflections 887 and 888 of the non-visible light from the cornea C and the lens L, respectively. Since the cornea and lens are at different depths, the parallax and refractive index between the reflections may be used to provide additional accuracy in determining the gaze direction GD. An example of this type of eye tracking system is a dual Purkinje tracker, wherein the corneal reflection is the first Purkinje Image and the lens reflection is the 4th Purkinje Image. There may also be reflections 190 from a user's eyeglasses 893, if these are worn a user.

Current HMD panels refresh at a constant rate of 90 or 120 Hertz (Hz) depending on the manufacturer. The high refresh rate increases power consumption of the panel and bandwidth requirements of the transmission medium to send frame updates. Information about gaze-tracking devices with foveated view and scaled encoding can be found in co-pending application Ser. No. 15/840,893, the contents of which are incorporated by reference.

Implementation

Figure 9:
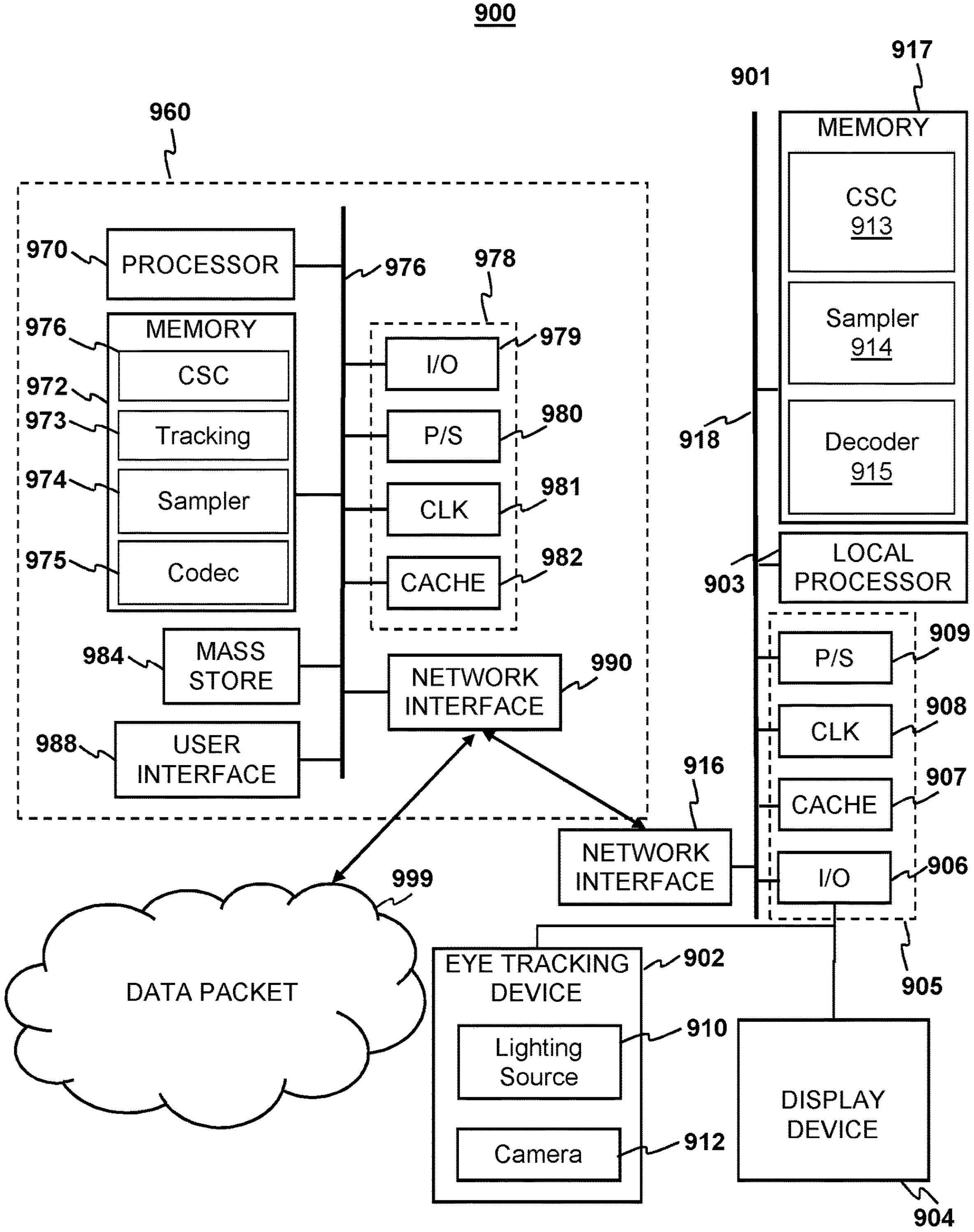
FIG. 9 is a block diagram depicting a system according to aspects of the present disclosure

FIG. 9 depicts an example system 900 to further illustrate various aspects of the present disclosure. The system 900 may include a computing device 960 which is coupled to an eye tracking display system 901. The eye tracking display device 901 comprises, a local processor 903, local memory 917, well known support circuits 905, a network interface 916, an eye tracking device 902 and a display device 904 in order to perform eye gaze tracking and/or calibration for eye tracking in accordance with aspects of the present disclosure. The display device 904 may be in the form of a cathode ray tube (CRT), flat panel screen, touch screen, or other device that displays text, numerals, graphical symbols, or other visual objects. The local processor 903 may be configured according to well-known architectures, such as, e.g., single-core, dual-core, quad-core, multi-core, processor-coprocessor, cell processor, and the like. The eye tracking display system 901 may also include one or more memory units 917 (e.g., random access memory (RAM), dynamic random access memory (DRAM), read-only memory (ROM), and the like).

The local processor unit 903 may execute one or more programs, portions of which may be stored in the memory 917, and the processor 903 may be operatively coupled to the memory 917 e.g., by accessing the memory via a data bus 918. The programs may be configured to create a video with a high fidelity ROI for the eye tracking display system 901. By way of example, and not by way of limitation, the programs may include a CSC 913, a video upsampler/downsampler program 914, and decoder programs 915. By way of example, and not by way of limitation, CSC 913 may include processor executable instructions which cause the system 901 to format an upsampled video stream received from the upsampler/downsampler program 914 create a video with a high fidelity ROI for display on the display device according to the above described methods 904. The sampler 914 may contain instruction that when executed cause the local processor to upsample a video stream or upsample sections of video frames in the video stream, received from the decoder 915. The decoder program 915 may contain instruction when executed by the local processor that causes the system to receive and decode encoded video stream data from the network interface 916. The decoder programs alternately may be implemented as discrete logical units (not shown) communicatively coupled to the local processor by e.g. the main bus 918. According to aspects of the present disclosure, eye tracking display device 901 may be an embedded system, mobile phone, personal computer, tablet computer, portable game device, workstation, game console, head mounted display device and the like. Moreover the computing device 960 may also be an embedded system, mobile phone, personal computer, tablet computer, portable game device, workstation, game console, and the like.

The eye tracking display device 901 may be coupled to the computing device 960, and may include a dynamic lighting source 910 similar to light sources 910 of FIGS. 8A-8B. By way of example, and not by way of limitation, the lighting source 910 may be an invisible lighting source in the form of one or more infrared LEDs, which may be configured to illuminate a user's eyes in order to gather eye tracking data with the sensor 912. The sensor 912 of the eye tracking device may be a detector which is sensitive to light emitted from the light source 910. For example, the sensor 912 may be a camera sensitive to the light source such as an infrared camera, and the camera 912 may be positioned relative to the eye tracking device and the lighting source so that it may capture images of an area illuminated by the lighting source 910.

The computing device 960 may be configured to operate in coordination with the eye tracking display system 901, in order to perform eye gaze tracking and determine lighting conditions in accordance with aspects of the present disclosure. The computing device 960 may include one or more processor units 970, which may be configured according to well-known architectures, such as, e.g., single-core, dual-core, quad-core, multi-core, processor-coprocessor, cell processor, and the like. The computing device 960 may also include one or more memory units 972 (e.g., random access memory (RAM), dynamic random access memory (DRAM), read-only memory (ROM), and the like).

The processor unit 970 may execute one or more programs, portions of which may be stored in the memory 972, and the processor 970 may be operatively coupled to the memory 972, e.g., by accessing the memory via a data bus 976. The programs may be configured to perform eye gaze tracking and determine lighting conditions for the system 900. By way of example, and not by way of limitation, the programs may include gaze tracking programs 973, execution of which may cause the system 900 to track a user's gaze, By way of example, and not by way of limitation, the gaze tracking programs 973 may include processor executable instructions which cause the system 900 to determine one or more gaze tracking parameters of the system 900 from eye tracking data gathered with the camera 912 while light is emitted from the dynamic lighting source 910. The gaze tracking programs 973 may also include instructions which analyze images gathered with the camera 912, e.g., as described above with respect to FIG. 8B. The gaze tracking programs alternately may be implemented as discrete logical units (not shown) communicatively coupled to the local processor by e.g. the main bus 918.

In some implementations, the gaze tracking program 973 may analyze gaze tracking information to predict periods in which the user's visual percept is obscured, e.g., during blinks, or inactive, e.g., during saccades. Predicting the onset of such periods can be used to reduce unnecessary rendering computations, power consumption and network bandwidth usage. Examples of such techniques are described in commonly-assigned U.S. patent application Ser. No. 15/086,953, filed Mar. 31, 2016, the entire contents of which are incorporated herein by reference.

The computing device 960 and the eye tracking display device 901 may also include well-known support circuits 978 905, such as input/output (I/O) circuits 979 906, power supplies (P/S) 980 909, a clock (CLK) 981 908, and cache 982 907, which may communicate with other components of the system, e.g., via the bus 976 918, respectively. The computing device 960 may include a network interface 990 to facilitate communication with similarly configured network interface 916 on the eye tracking display device 901. The processor units 970 903 and network interfaces 990 916 may be configured to implement a local area network (LAN) or personal area network (PAN), via a suitable network protocol, e.g., Bluetooth, for a PAN. The computing device 960 may optionally include a mass storage device 984 such as a disk drive, CD-ROM drive, tape drive, flash memory, or the like, and the mass storage device 984 may store programs and/or data. The computing device 960 may also include a user interface 988 to facilitate interaction between the system 900 and a user. The user interface 988 may include a keyboard, mouse, light pen, game control pad, touch interface, or other device. In alternative embodiment the user interface 988 may also include a display screen and the computing device 960 may have the encoder/decoder (Codec) 975 decode an encoded video stream in data packets 999 from a network, the Upsampler/downsampler program 974 may take the down-sampled video stream up-sample the video stream with the high fidelity ROI as described above, the CSC program 976 may take the upsampled video screen and configure it for display on the display screen coupled to the user interface 988. For example, the CSC could convert an input image from one color format to another color format (e.g., from RGB to YUV or vice versa) prior to encoding. In this embodiment the head tracker may not be present and the ROI location may be determined by predictive methods described above. In other embodiments the head tracker may be present but a display screen may not be coupled to the tracking device. In other embodiments, the encoder may transmit encoded video stream data and ROI parameters through the network interface 916, which will be received and processed by the decoder program 915.

The system 900 may also include a controller (not pictured) which interfaces with the eye tracking display device 901 in order to interact with programs executed by the processor unit 970. The system 900 may also execute one or more general computer applications (not pictured), such as a video game or video stream, which may incorporate aspects of eye gaze tracking as sensed by the tracking device 902 and processed by the tracking programs 993, CSC 976, upsampler/downsampler 974 that convert the video frame data to a form that can be presented by a display device, and video stream encoder 975.

The computing device 960 may include a network interface 990, configured to enable the use of Wi-Fi, an Ethernet port, or other communication methods. The network interface 990 may incorporate suitable hardware, software, firmware or some combination thereof to facilitate communication via a telecommunications network. The network interface 990 may be configured to implement wired or wireless communication over local area networks and wide area networks such as the Internet. The network interface 990 may also include the aforementioned wireless transceiver that facilitates wireless communication with the eye tracking device 902 and display device 979. The computing device 360 may send and receive data and/or requests for files via one or more data packets 999 over a network.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for video encoding, comprising:

a) determining one or more parameters for a region of interest (ROI) within a digital image, wherein the one or more parameters relate to a size, location, and shape of the ROI;

b) performing multi-segment downsampling on the input image to generate a downsampled image having fewer pixels than the digital image, wherein the multi-segment downsampling performed on the digital image uses a different sample density for the ROI than for a portion of the digital image outside the region of interest, wherein the multi-segment downsampling is performed using a quadratic function wherein the sampling density becomes progressively sparser as a function of distance from the ROI;

c) encoding the downsampled image to generate encoded image data;

d) combining the encoded image data with the one or more parameters to generate combined data; and e) transmitting or storing the combined data.

2. The method of claim 1, wherein the multi-segment downsampling performed on the digital image uses a higher sample density for the ROI than for a portion of the digital image outside the region of interest.

3. The method of claim 2, wherein the sample density of the ROI is the sample density of the digital image.

4. The method of claim 1, wherein the one or more parameters include offsets from each edge of a rectangular image to an ROI boundary.

5. The method of claim 1, wherein the ROI is rectangular.

6. The method of claim 1 wherein the ROI is substantially circular.

7. The method of claim 1, wherein the one or more parameters for the ROI include an offset of the ROI from an edge of the digital image.

8. The method of claim 1, wherein the one or more parameters for the ROI include offsets of the ROI from left, right, top, and bottom edges of the digital image.

9. The method of claim 1 wherein the multi-segment downsampling performed on the digital image uses a lower sample density for the ROI than for a portion of the digital image outside the region of interest.

10. The method of claim 1 wherein multi-segment downsampling is performed non-linearly outside the ROI.

11. The method of claim 1 wherein multi-segment downsampling is performed linearly outside the ROI.

12. The method of claim 1 wherein the one or more parameters for a ROI are determined from gaze tracking data.

13. The method of claim 1 wherein the one or more parameters for a ROI are determined from an area of interest prediction algorithm.

14. The method of claim 1 wherein there are more than one ROI.

15. The method of claim 14 wherein the one or more parameters for the ROI include an identifier in the parameters to specify which ROI the parameters refer.

16. The method of claim 1 wherein a) further comprises comparing the one or more parameters for the ROI to a threshold and when the one or more parameters for the ROI do not meet the threshold, b) comprises terminating the multi-segment downsampling operation at a current output resolution and c) comprises encoding a higher or lower resolution version of the multi-segment downsampled digital image.

17. A method for video decoding, comprising:

a) decoding encoded image data to generate decoded image data for a digital image;

b) performing multi-segment upsampling on the decoded image data to convert the digital image to an upsampled image having more pixels than the digital image using one or more parameters that relate to a location, size, and shape of the ROI to the upsampled image, wherein the multi-segment upsampling performed on the digital image uses a different sample density for the ROI than for a portion of the digital image outside the region of interest, where the multi-segment upsampling is performed using a square-root function wherein the wherein the sampling density becomes progressively more dense as a function of distance to the ROI; and c) displaying or storing the upsampled image.

18. The method of claim 17, wherein the multi-segment upsampling performed on the digital image uses a lower sample density for the ROI than for a portion of the digital image outside the region of interest.

19. The method of claim 17 wherein the multi-segment upsampling is performed non-linearly outside the ROI.

* * * * *